(12) United States Patent
Hatano

(10) Patent No.: US 10,483,859 B2
(45) Date of Patent: Nov. 19, 2019

(54) AC/DC CONVERTER INCLUDING A BIDIRECTIONAL SWITCH

(71) Applicant: Rohm Co., Ltd., Kyoto (JP)

(72) Inventor: Hiroyuki Hatano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 190 days.

(21) Appl. No.: 15/345,723

(22) Filed: Nov. 8, 2016

(65) Prior Publication Data
US 2017/0141689 A1 May 18, 2017

(30) Foreign Application Priority Data

Nov. 12, 2015 (JP) .................... 2015-222256
Nov. 12, 2015 (JP) .................... 2015-222260
Nov. 12, 2015 (JP) .................... 2015-222263
Oct. 6, 2016 (JP) .................... 2016-197984

(51) Int. Cl.
*H02M 3/335* (2006.01)
*H02M 1/42* (2007.01)

(52) U.S. Cl.
CPC ..... *H02M 3/33546* (2013.01); *H02M 1/4241* (2013.01); *H02M 3/33507* (2013.01); *H02M 3/33523* (2013.01); *H02M 3/33538* (2013.01); *H02M 3/33553* (2013.01); *Y02B 70/126* (2013.01); *Y02B 70/1433* (2013.01)

(58) Field of Classification Search
CPC ........... H02M 1/4241; H02M 3/33507; H02M 3/33523; H02M 3/33538; H02M 3/33553
See application file for complete search history.

(56) References Cited

U.S. PATENT DOCUMENTS

| 5,991,171 A * | 11/1999 | Cheng ............... H02M 3/33507 363/21.03 |
| 6,172,884 B1 * | 1/2001 | Lanni ................. H01R 13/6675 363/21.05 |
| 2008/0285319 A1 * | 11/2008 | Deisch .............. H02M 3/33507 363/90 |

(Continued)

FOREIGN PATENT DOCUMENTS

| JP | 2011-193709 | 9/2011 |
| JP | 2011-259673 | 12/2011 |
| JP | 5007966 | 6/2012 |

*Primary Examiner* — Jue Zhang
*Assistant Examiner* — Lakaisha Jackson
(74) *Attorney, Agent, or Firm* — Fish & Richardson P.C.

(57) ABSTRACT

An AC/DC converter includes a transformer including a primary winding connected to an AC power source and a secondary winding electromagnetically coupled to the primary winding, a bidirectional switch connected in series to the primary winding, a resonant capacitor connected in parallel or series to the bidirectional switch, a full-wave rectification circuit arranged to perform full-wave rectification of an induced voltage generated in the secondary winding, a smoothing capacitor arranged to smooth an output of the full-wave rectification circuit, and a control circuit arranged to turn on and off the bidirectional switch. The transformer is a leakage transformer or a resonant transformer having leakage inductance. The AC converter takes out both forward voltage and flyback voltage from the secondary winding, so as to directly convert an AC input voltage supplied from the AC power source into a DC output voltage.

10 Claims, 33 Drawing Sheets

(56) References Cited

U.S. PATENT DOCUMENTS

| | | | |
|---|---|---|---|
| 2011/0292691 A1* | 12/2011 | Matsumoto | H02M 3/33523 363/21.12 |
| 2011/0305043 A1 | 12/2011 | Matsumoto | |
| 2014/0029312 A1* | 1/2014 | Telefus | H02M 3/33523 363/21.02 |
| 2014/0092643 A1* | 4/2014 | Luccato | H02M 3/335 363/21.12 |
| 2015/0103566 A1* | 4/2015 | Keogh | H02M 3/33507 363/21.12 |

* cited by examiner

AC/DC CONVERTER INCLUDING A BIDIRECTIONAL SWITCH

CROSS-REFERENCE TO RELATED APPLICATIONS

This application claims priority based on Japanese Patent Applications listed below, the contents of which are hereby incorporated by reference.

(1) Japanese Patent Application No. 2015-222263 filed on Nov. 12, 2015

(2) Japanese Patent Application No. 2015-222260 filed on Nov. 12, 2015

(3) Japanese Patent Application No. 2015-222256 filed on Nov. 12, 2015

(4) Japanese Patent Application No. 2016-197984 filed on Oct. 6, 2016

BACKGROUND OF THE INVENTION

Field of the Invention

The present invention relates to an AC/DC converter and a driving circuit.

Description of Related Art

<First Related Art>

Recent years, there is proposed an AC/DC converter that can directly convert an AC input voltage into a DC output voltage (see, for example, Japanese Patent No. 5007966 and JP-A-2011-193709).

<Second Related Art>

In addition, recent years, there is proposed an insulation type AC/DC converter that realizes software switching function using a resonant capacitor (see, for example, JP-A-2011-193709).

<Third Related Art>

In addition, conventionally, there is known a driving circuit that sends a control signal from a primary side to a control IC on a secondary side via a pulse transformer, so as to control the control IC to turn on and off a switching element on the secondary side (see, for example, JP-A-2011-259673).

<Problem about the First Related Art>

However, the conventional AC/DC converter described above has a structure in which an ON/OFF ratio is selected so that an absolute value of a flyback voltage becomes higher than an absolute value of a peak value of a forward voltage, and thus only the flyback voltage is output. Therefore a disadvantage of a flyback method, which is that peak current generated in a secondary winding of an insulation transformer is increased, is not improved, and therefore it is not suitable for a power supply for use of handling middle or high power (for example, 100 W or higher) in particular.

In addition, in the conventional AC/DC converter described above, when it is activated or a load is short-circuited, an absolute value of a flyback voltage can be lower than an absolute value of a peak value of a forward voltage. In this state, unintentional forward operation may be generated so that excessive current may flow in the secondary side, which may cause abnormal heating or breakdown of an element.

In view of the above-mentioned problem found by the inventors, it is a first object of the invention disclosed in this specification to provide an AC/DC converter that can directly convert an AC input voltage into a DC output voltage with high efficiency also when being applied to a middle or high power.

<Problem about the Second Related Art>

When excitation energy of the transformer becomes zero, a voltage across both ends of the resonant capacitor starts to drop along with oscillation. Therefore, the conventional AC/DC converter described above has a structure in which a point at which the excitation energy of the transformer becomes zero is detected, and the detected signal is delayed by a constant delay time so that a switching drive signal is generated.

However, the necessary time after the excitation energy of the transformer becomes zero until the voltage across both ends of the resonant capacitor becomes 0 V depends on an input and output state in each period and is not always constant.

Therefore, the conventional AC/DC converter described above with the constant delay time has a problem that an error occurs in the switching drive timing, and hence the software switching cannot be correctly performed, resulting in deterioration of conversion efficiency.

In addition, the conventional AC/DC converter described above has another problem that a delay circuit, an external resistor, and the like are necessary, so that a circuit scale is increased.

In view of the above-mentioned problem found by the inventors, it is a second object of the invention disclosed in this specification to provide an AC/DC converter that can realize the software switching function in a simple and precise manner.

<Problem about the Third Related Art>

In the conventional driving circuit described above, in a period while an ON pulse or an OFF pulse is output to the secondary winding of the pulse transformer, it is required to continuously apply a drive voltage to a primary winding of the pulse transformer. Therefore, there is a problem that drive current flowing in the primary winding continuously increases over time, and hence current consumption is large.

In addition, in order to decrease rising time and falling time of an induced voltage generated in the secondary winding so as to increase responsiveness when driving the switching element on the secondary side, it is necessary to rapidly charge and discharge a parasitic capacitor between gate and source of the switching element (for example, MOSFET). For this purpose, it is necessary to decrease inductance of the primary winding, and as a result, the drive current is increased. In this way, the conventional driving circuit described above has another problem that a decrease of current consumption and an improvement of responsiveness are incompatible.

In addition, in an application using a high voltage withstand switching element (such as a SiC power device) on the secondary side, a gate voltage of the switching element is required to be higher than power supply voltage on the primary side in many cases. Therefore the inductance of the primary winding must be increased more, and hence the problem described above becomes more conspicuous.

In view of the above-mentioned problem found by the inventors, it is a third object of the invention disclosed in this specification to provide a driving circuit that can realize both the decrease of current consumption and the improvement of responsiveness.

SUMMARY OF THE INVENTION

Means for Solving the Problem about the First Related Art

An AC/DC converter disclosed in this specification includes a transformer including a primary winding connected to an AC power source and a secondary winding electromagnetically coupled to the primary winding, a bidirectional switch connected in series to the primary winding, a resonant capacitor connected in parallel or series to the bidirectional switch, a full-wave rectification circuit arranged to perform full-wave rectification of an induced voltage generated in the secondary winding, a smoothing capacitor arranged to smooth an output of the full-wave rectification circuit, and a control circuit arranged to turn on and off the bidirectional switch. The transformer is a leakage transformer or a resonant transformer having leakage inductance, and the AC/DC converter takes out both forward voltage and flyback voltage from the secondary winding so as to directly convert an AC input voltage supplied from the AC power source into a DC output voltage.

In addition, an AC/DC converter disclosed in this specification includes a transformer including a primary winding connected to an AC power source and a secondary winding electromagnetically coupled to the primary winding, a bidirectional switch connected in series to the primary winding, a resonant capacitor connected in parallel or series to the bidirectional switch, a full-wave rectification circuit arranged to perform full-wave rectification of an induced voltage generated in the secondary winding, a smoothing capacitor arranged to smooth an output of the full-wave rectification circuit, a control circuit arranged to turn on and off the bidirectional switch, and a coil connected to at least one of the primary winding and the secondary winding. The AC/DC converter takes out both forward voltage and flyback voltage from the secondary winding, so as to directly convert an AC input voltage supplied from the AC power source into a DC output voltage.

<Means for Solving the Problem about the Second Related Art>

In addition, an AC/DC converter disclosed in this specification includes a transformer including a primary winding connected to an AC power source and a secondary winding electromagnetically coupled to the primary winding, a bidirectional switch connected in series to the primary winding, a resonant capacitor connected in parallel or series to the bidirectional switch, a capacitor voltage divider circuit arranged to divide a voltage across both ends of the bidirectional switch so as to generate a divided voltage, and a control circuit arranged to turn on the bidirectional switch at a timing when the divided voltage becomes zero.

<Means for Solving the Problem about the Third Related Art>

In addition, a driving circuit disclosed in this specification is arranged to charge and discharge a parasitic capacitor between gate and source of a MOS switch according to an induced voltage generated in a secondary winding of a pulse transformer, so as to turn on and off the MOS switch. The driving circuit includes a diode having an anode connected to a first tap of the secondary winding and a cathode connected to the gate of the MOS switch, and an NMOSFET having a source connected to the first tap of the secondary winding, a drain connected to the gate of the MOS switch, and a gate connected to a second tap of the secondary winding.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

First Embodiment

Figure 1A:
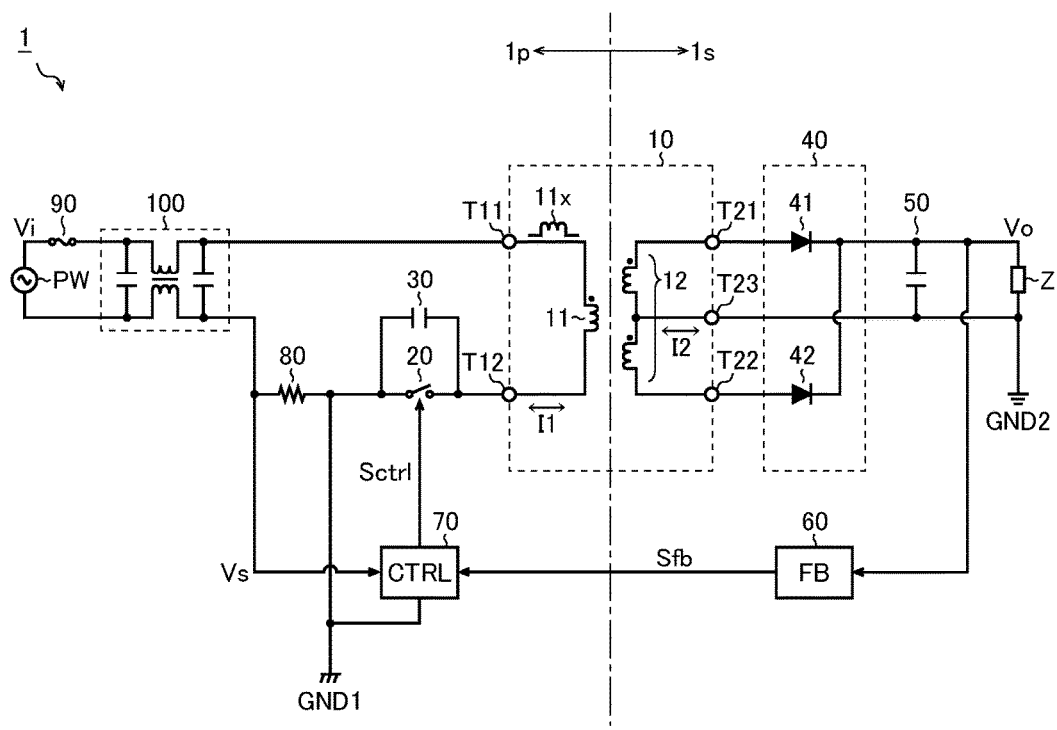
FIG. 1A is a circuit diagram illustrating a first embodiment of an AC/DC converter.

FIG. 1A is a circuit diagram illustrating a first embodiment of an AC/DC converter. An AC/DC converter 1 of this embodiment is a power supply device, which electrically isolates between a primary circuit system 1p (GND1 system) and a secondary circuit system 1s (GND2 system), and directly converts an AC input voltage Vi supplied from an AC power source PW into a DC output voltage Vo so as to supply it to a load Z. The AC/DC converter 1 includes a transformer 10, a bidirectional switch 20, a resonant capacitor 30, a full-wave rectification circuit 40, a smoothing capacitor 50, a feedback circuit 60, a control circuit 70, a sense resistor 80, a power fuse 90, and a filter circuit 100.

The transformer 10 includes a primary winding 11 disposed in the primary circuit system 1p, a secondary winding 12 disposed in the secondary circuit system 1s so as to be electromagnetically coupled to the primary winding 11. A first tap T11 of the primary winding 11 is connected to a first terminal of the AC power source PW via the filter circuit 100 and the power fuse 90. A second tap T12 of the primary winding 11 is connected to a second terminal of the AC power source PW via the bidirectional switch 20, the sense resistor 80, and the filter circuit 100. A first tap T21 and a second tap T22 of the secondary winding 12 are connected to an output terminal of the DC output voltage Vo (i.e. a first terminal of the load Z) via the full-wave rectification circuit 40. A center tap T23 of the secondary winding 12 is connected to a secondary side common GND2 (i.e. a second terminal of the load Z).

In particular, the AC/DC converter 1 of this embodiment uses a leakage transformer or a resonant transformer having leakage inductance 11x as the transformer 10 (the reason will be described later). Note that, in this diagram, for convenience sake of illustration, the leakage inductance 11x is illustrated as accompanying the first tap T11 side of the primary winding 11.

A first terminal of the bidirectional switch 20 is connected to the second tap T12 of the primary winding 11. A second terminal of the bidirectional switch 20 is connected to a first terminal of the sense resistor 80 and a primary side common GND1. The bidirectional switch 20 connected in this way works as an output switch arranged to turn on and off a primary current I1 flowing in the primary winding 11 according to a control signal Sctrl input from the control circuit 70.

The resonant capacitor 30 is connected in parallel to the bidirectional switch 20 so as to form an LLC resonant circuit together with the primary winding 11 of the transformer 10 and the leakage inductance 11x. Accordingly, as a leakage transformer or a resonant transformer is used as the transformer 10, even if there is generated excess energy that is not supplied from the primary winding 11 to the secondary winding 12, this energy can be regenerated and used, and hence conversion efficiency of the AC/DC converter 1 is not deteriorated.

In addition, as the resonant capacitor 30 is disposed, energy variation in the transformer 10 when the bidirectional switch 20 is turned off can be gentle. Therefore it is possible to eliminate a surge absorption element such as a snubber circuit that is conventionally necessary, and it is also possible to reduce harmonic components.

Figure 1B:
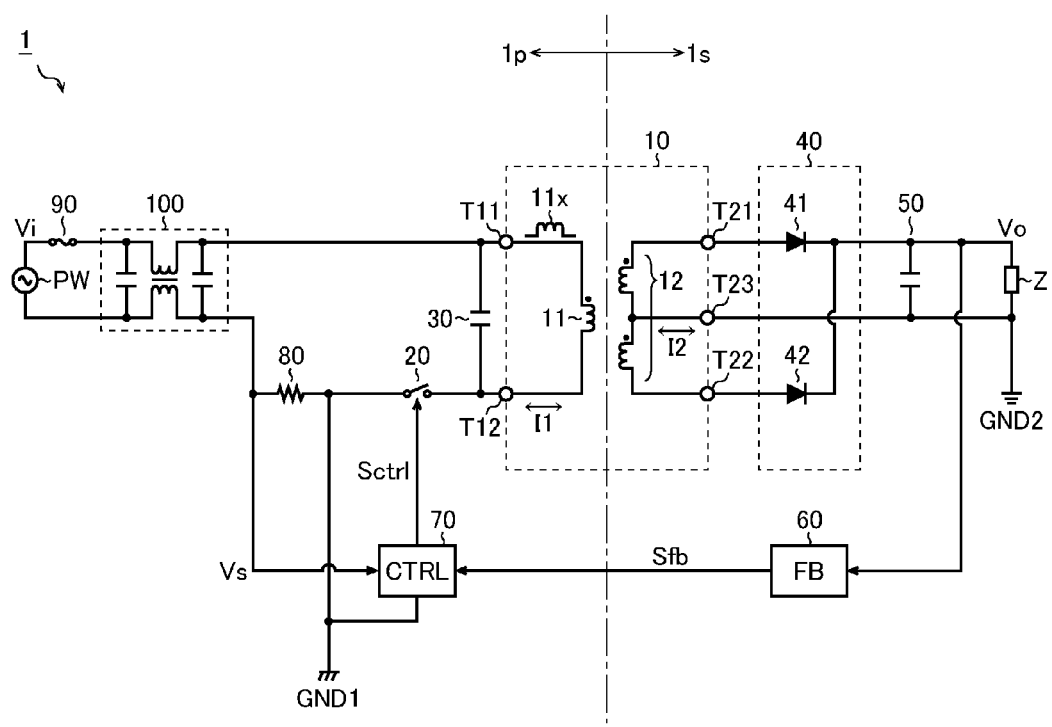
FIG. 1B is a circuit diagram illustrating a first variation of the AC/DC converter.
Figure 1C:
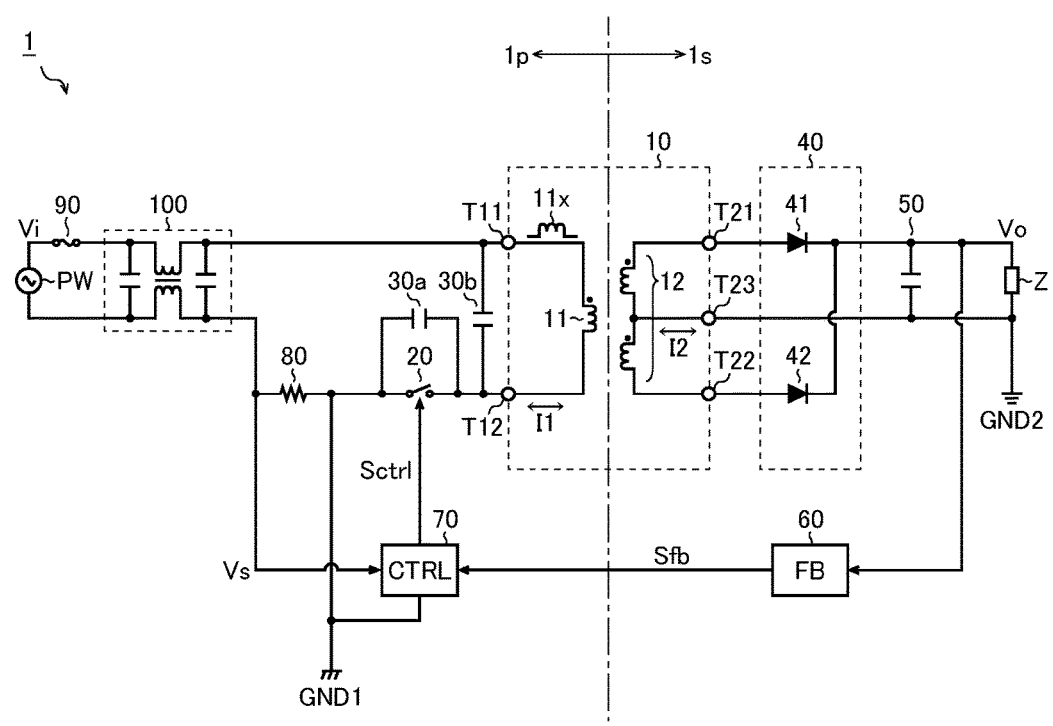
FIG. 1C is a circuit diagram illustrating a second variation of the AC/DC converter.

Note that, concerning a connection position of the resonant capacitor 30, it may be connected in series to the bidirectional switch 20 as illustrated in FIG. 1B (i.e., the resonant capacitor 30 may be connected in parallel to the primary winding 11 of the transformer 10), or it is possible to adopt as structure illustrated in FIG. 1C, which includes both a resonant capacitor 30a connected in parallel to the bidirectional switch 20 and a resonant capacitor 30b connected in series to the bidirectional switch 20.

The full-wave rectification circuit 40 is a circuit portion that performs full-wave rectification of an induced voltage generated in the secondary winding 12 (i.e., a flyback voltage or a forward voltage described later in detail), including diodes 41 and 42. The anode of the diode 41 is connected to the first tap T21 of the secondary winding 12. The anode of the diode 42 is connected to the second tap T22 of the secondary winding 12. The cathode of the diode 41 and the cathode of the diode 42 are both connected to the output terminal of the DC output voltage Vo.

Note that, when the diode 41 is forward biased while the diode 42 is reverse biased, a secondary current I2 flows in a current path from the first tap T21 of the secondary winding 12 to the output terminal of the DC output voltage Vo via the diode 41. On the other hand, when the diode 42 is forward biased while the diode 41 is reverse biased, the secondary current I2 flows in a current path from the second tap T22 of the secondary winding 12 to the output terminal of the DC output voltage Vo via the diode 42.

The smoothing capacitor 50 is connected between the output terminal of the DC output voltage Vo and the secondary side common GND2, and it smoothes the output of the full-wave rectification circuit 40 so as to generate the DC output voltage Vo.

The feedback circuit 60 generates a feedback signal Sfb corresponding to the DC output voltage Vo and outputs it to the control circuit 70. Note that, in order to transmit the feedback signal Sfb from the secondary circuit system 1s to the primary circuit system 1p, an insulating transmission element such as a photocoupler should be used.

The control circuit 70 operates using the primary side common GND1 as a reference potential and generates the control signal Sctrl for turning on and off the bidirectional switch 20. Note that the control circuit 70 has a function of monitoring the feedback signal Sfb input from the feedback circuit 60 so as to turn on and off the bidirectional switch 20 so that the DC output voltage Vo becomes a desired target value (i.e. an output feedback control function). With this function, it is possible to stably supply the constant DC output voltage Vo to the load Z.

In addition, the control circuit 70 has a function of monitoring a sensed voltage Vs at a second terminal of the sense resistor 80 (i.e. a voltage signal corresponding to the primary current I1) so as to turn on and off the bidirectional switch 20 so that the primary current I1 does not exceed a predetermined upper limit value (i.e. a constant current control function). With this function, excessive primary current I1 does not flow in the primary circuit system 1p, and hence safety of the AC/DC converter 1 can be enhanced.

In addition, the control circuit 70 has a function of monitoring a voltage across both ends of the resonant capacitor 30 (thus a voltage across both ends of the bidirectional switch 20) so as to turn on the bidirectional switch 20 at a timing when the voltage becomes 0 V (i.e. a zero-volt switching (ZVS) function). With this function, it is possible to reduce switching loss caused by the parasitic capacitor of the bidirectional switch 20 and the resonant capacitor 30, and hence conversion efficiency of the AC/DC converter 1 can be enhanced.

In addition, the control circuit 70 has a function of monitoring the feedback signal Sfb and the sensed voltage Vs so as to turn on and off the bidirectional switch 20 so that the power factor becomes close to one (i.e. a power factor improvement function). With this function, an additional power factor improvement circuit is not necessary, and hence it is possible to realize the AC/DC converter 1 of a single converter type. Note that, in order to enhance accuracy of power factor improvement, it is desired that the control circuit 70 should also monitor the AC input voltage Vi.

The sense resistor 80 (having a resistance R80) is inserted in the current path in which the primary current I1 flows, so as to generate the sensed voltage Vs corresponding to the primary current I1 (i.e. I1×R80).

The power fuse 90 is blown when current above rating flows, so as to protect a post-stage circuit.

The filter circuit 100 includes an X capacitor arranged to reduce differential mode noise (or called normal mode noise) and a common mode filter arranged to reduce common mode noise (i.e. a toroidal core and two coils wound around it in the same direction), so as to eliminate various noise components superimposed on the AC input voltage Vi. A first input terminal of the filter circuit 100 is connected to the first terminal of the AC power source PW via the power fuse 90. A second input terminal of the filter circuit 100 is connected to the second terminal of the AC power source PW. A first output terminal of the filter circuit 100 is connected to the first tap T11 of the primary winding 11. A second output terminal of the filter circuit 100 is connected to the second terminal of the sense resistor 80.

Figure 2:
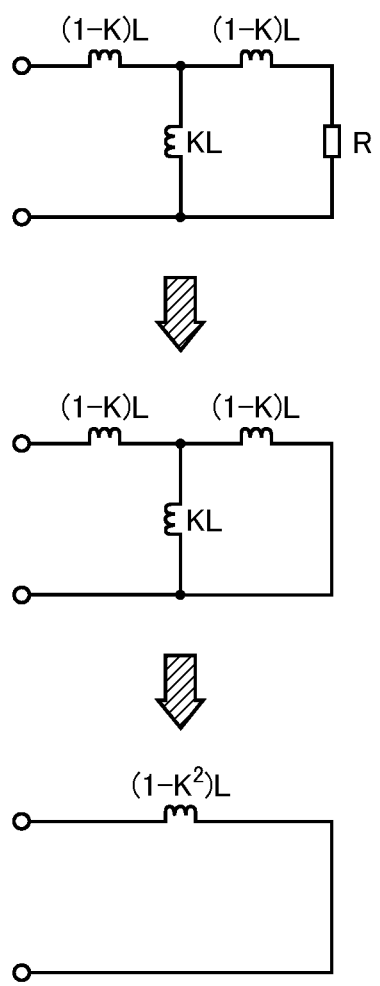
FIG. 2 is an equivalent circuit diagram of a transformer.

FIG. 2 is an equivalent circuit diagram of the transformer 10. As illustrated in the upper part of this diagram, when a coupling coefficient of the transformer 10 is denoted by K, magnetizing inductance of the transformer 10 is expressed by KL, and leakage inductance of the transformer 10 is expressed by (1−K)L.

It is supposed that a load R connected to the secondary side of the transformer 10 is 0Ω (when the AC/DC converter 1 is activated or when the output is short-circuited). In this case, as illustrated in the middle part of this diagram, both ends of the magnetizing inductance KL are short-circuited. Therefore an equivalent inductance of the transformer 10 is expressed by $(1-K^2)L$ as illustrated in the lower part of this diagram.

Here, if the coupling coefficient K of the transformer 10 is large (for example, if K is nearly equal to 1), the equivalent inductance $(1-K^2)L$ of the transformer 10 is substantially zero. Therefore very large current flows in the transformer 10, and this is a bad state.

Therefore the AC/DC converter 1 of this embodiment uses a leakage transformer or a resonant transformer having a small coupling coefficient K (for example, K is 0.6 to 0.9) as the transformer 10. With this structure, also when the AC/DC converter 1 is activated or when the output is short-circuited, the equivalent inductance $(1-K^2)L$ of the transformer 10 does not become too small, and hence the above-mentioned problem can be solved.

In addition, as described above, the leakage inductance 11x of the transformer 10 can be used also as an element constituting the LLC resonant circuit, which can contribute to improvement of conversion efficiency of the AC/DC converter 1.

Further, the leakage inductance 11x of the transformer 10 functions also as a choke coil. Therefore, the AC/DC converter 1 of this embodiment can use both a flyback method and a forward method though it has a circuit structure of the flyback method.

Note that, if a tight coupling transformer having a large coupling coefficient K (approximately 0.99) is used as the transformer 10, on time of the bidirectional switch 20 in the forward operation becomes too short, and hence switching control by the control circuit 70 becomes very difficult. Therefore, also from a viewpoint of stability of control, it is important to use a leakage transformer or a resonant transformer having a small coupling coefficient K as the transformer 10.

Figure 3:
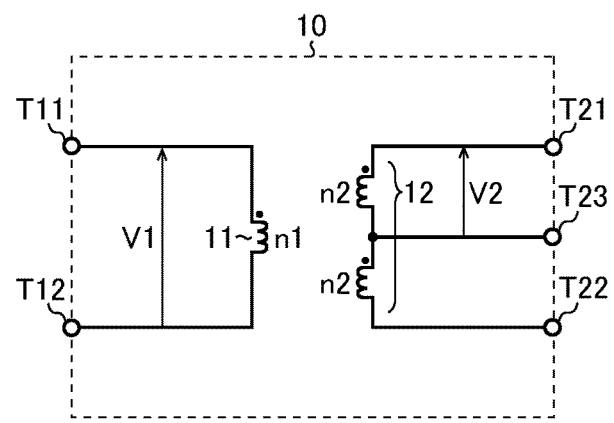
FIG. 3 is a schematic diagram for explaining a relationship between an input-output ratio and a winding ratio of a transformer.

FIG. 3 is a schematic diagram for explaining a relationship between an input-output ratio and a winding ratio of the transformer 10. It is supposed that the number of turns of the primary winding 11 is n1, the number of turns of the secondary winding 12 (the number of turns from the first tap T21 or the second tap T22 to the center tap T23 in this structural example) is n2, the applied voltage to the primary winding 11 is V1, and the applied voltage to the secondary winding 12 is V2. Then, the following equation (1) is satisfied in general.

$$V2=(n2/n1)\times V1\times K \tag{1}$$

Here, in order to drive the transformer 10 using only the flyback method, the following equation (2) must be satisfied. Note that, V1 max in the equation (2) indicates a maximum applied voltage to the primary winding 11.

$$n2/n1<V2/(V1\ \mathrm{max}\times K) \tag{2}$$

On the other hand, the AC/DC converter 1 of this embodiment can use both the flyback method and the forward method by satisfying the following equation (3).

$$n2/n1\geq V2/(V1\ \mathrm{max}\times K) \tag{3}$$

Figure 4:
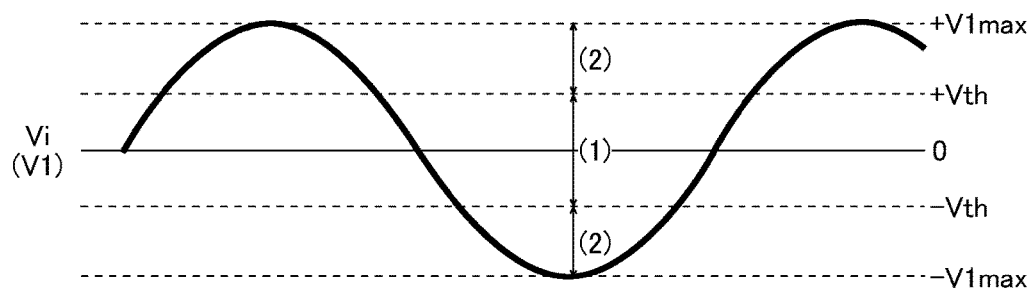
FIG. 4 is a schematic diagram illustrating a relationship between an AC input voltage and an operation mode.

FIG. 4 is a schematic diagram illustrating a correlation relationship between the AC input voltage Vi (i.e. the applied voltage V1 to the primary winding 11) and operation modes of the AC/DC converter 1. As illustrated in this diagram, the operation mode of the AC/DC converter 1 of this embodiment is one of a first operation mode, in which the flyback method is solely used according to a periodical variation of the AC input voltage Vi (see voltage range (1)), and a second operation mode, in which the flyback method and the forward method are both used (see voltage range (2)).

Specifically, if a threshold value voltage Vth is set so that |Vth|<V1 max is satisfied, in the voltage range (1) of −Vth<Vi<+Vth, the flyback method is solely used as the first operation mode. On the other hand, in the voltage range (2) of −V1 max≤Vi≤−Vth or +Vth≤Vi≤+V1 max, the flyback method and the forward method are both used as the second operation mode.

Figure 5:
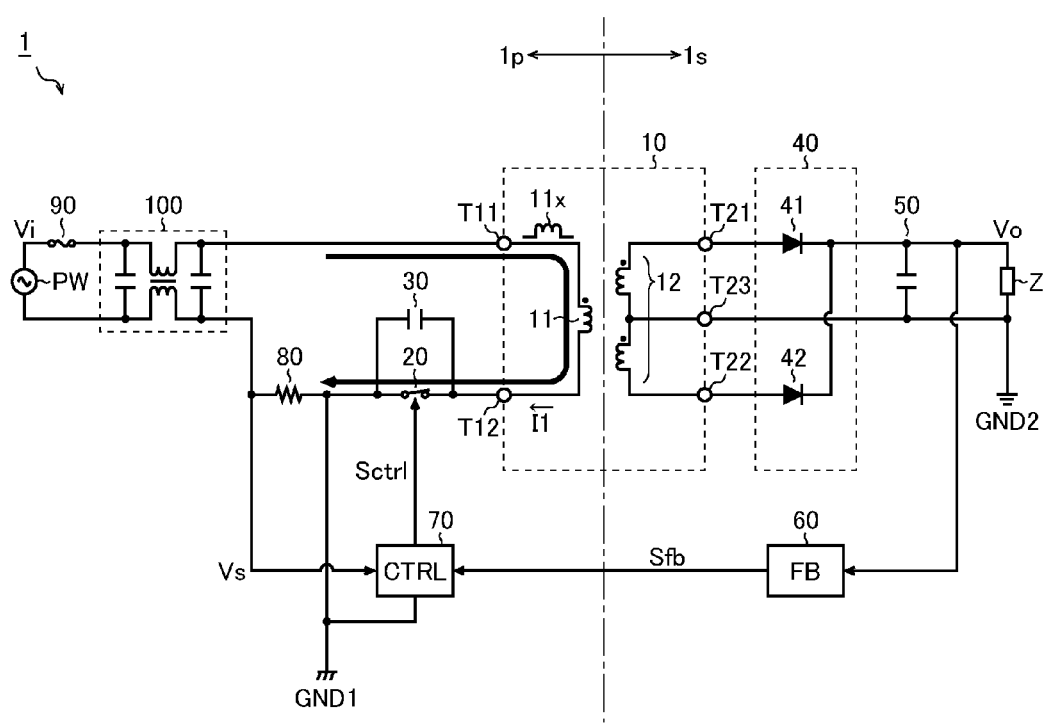
FIG. 5 is a circuit diagram illustrating a current path during a switch-on period in a first operation mode.

FIG. 5 is a circuit diagram illustrating a current path during a switch-on period in the first operation mode (only the flyback method). During ON period of the bidirectional switch 20, the primary current I1 flows in the primary circuit system 1p so that energy is stored in the primary winding 11. For example, if the AC input voltage Vi is positive (T11>T12), the primary current I1 flows in the direction from the AC power source PW to the primary winding 11, to the bidirectional switch 20, and to the AC power source PW, as illustrated by a thick solid line arrow in this diagram. On the other hand, no current flows in the secondary winding 12.

Figure 6:
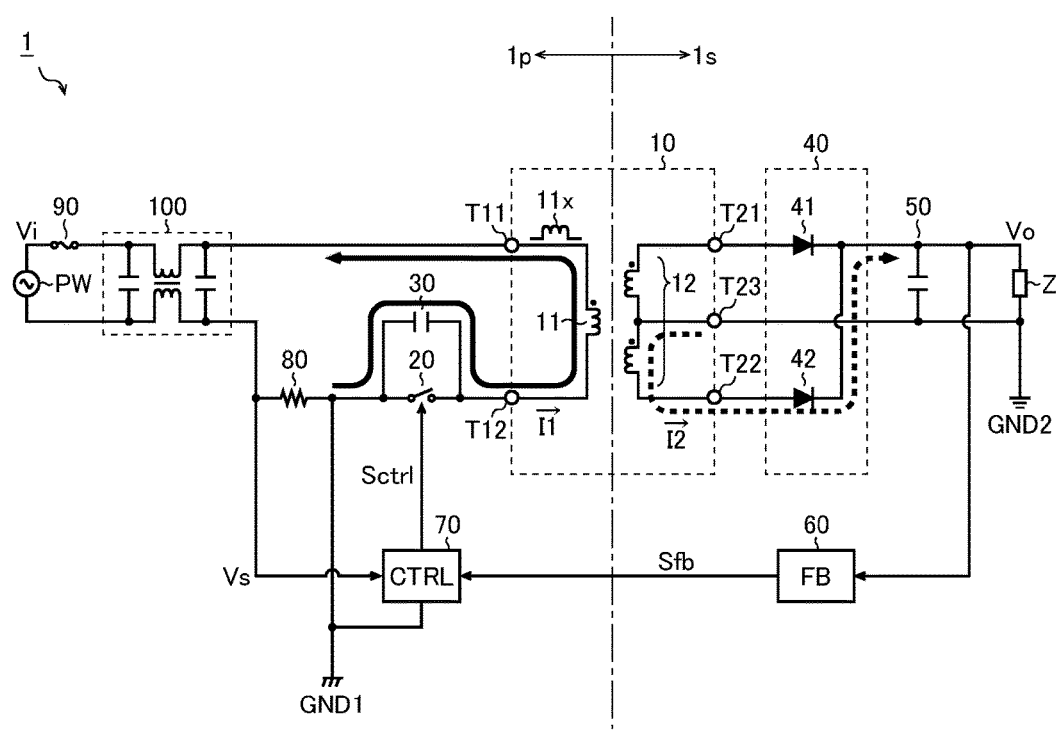
FIG. 6 is a circuit diagram illustrating a current path during a switch-off period in the first operation mode.

FIG. 6 is a circuit diagram illustrating a current path during a switch-off period in the first operation mode (only the flyback method). During OFF period of the bidirectional switch 20, the induced voltage (called the flyback voltage in this description) is generated in the secondary winding 12 magnetically coupled to the primary winding 11, and hence the secondary current I2 flows in the secondary circuit system 1s. For example, if energy is stored in the primary winding 11 in a state where the AC input voltage Vi is positive (T11>T12), the secondary current I2 flows in the direction from the secondary winding 12 (the second tap T22) to the diode 42, to the load Z, and to the secondary winding 12 (the center tap T23), as illustrated by a thick broken line arrow in this diagram.

In addition, when the bidirectional switch 20 is turned off, LLC resonant by the resonant capacitor 30 is generated in the primary circuit system 1p. As a result, the primary current I1 flows in the opposite direction to the just previous switch-on period as illustrated by a thick solid line arrow in this diagram.

Figure 7:
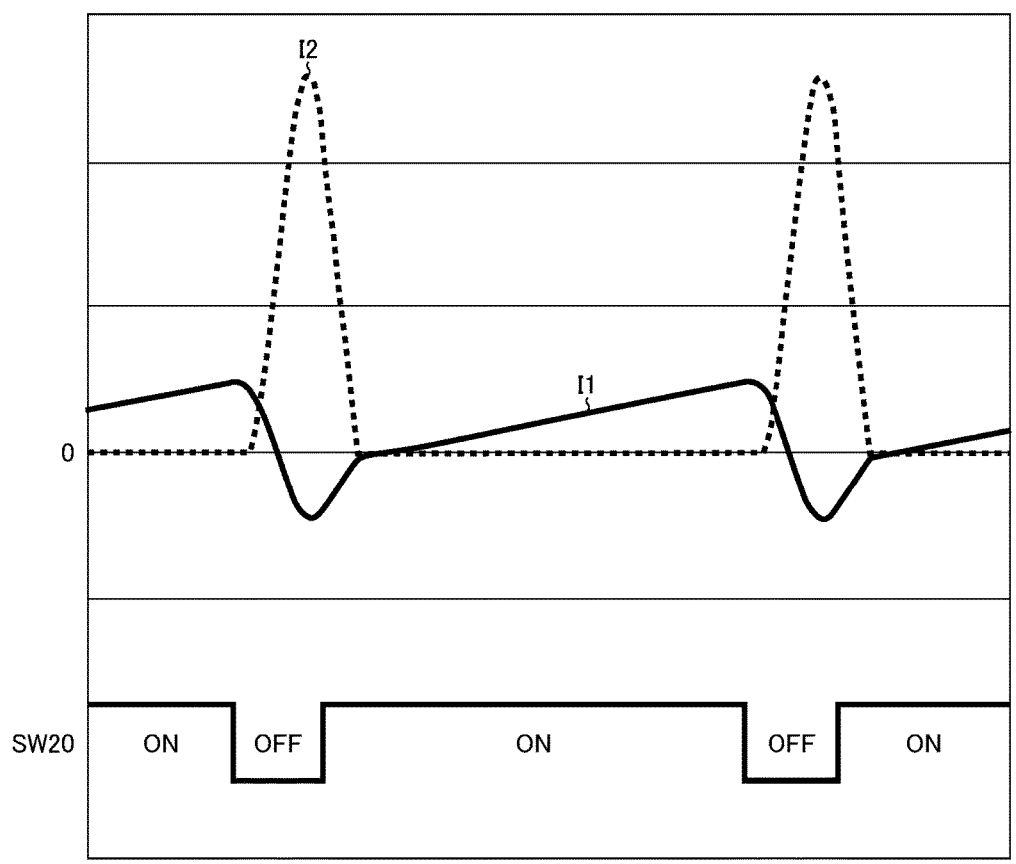
FIG. 7 is a waveform diagram illustrating current behavior in the first operation mode.

FIG. 7 is a waveform diagram illustrating current behavior in the first operation mode (only the flyback method). A solid line indicates the primary current I1, while a broken line indicates the secondary current I2. Note that this diagram illustrates current behavior when the AC input voltage Vi is positive (T11>T12).

As illustrated in this diagram, during the ON period of the bidirectional switch 20, the primary current I1 linearly increases with a positive gradient according to the inductance of the primary winding 11. After that, when the bidirectional switch 20 is turned off, the primary current I1 begins to decrease and further begins to flow in the negative direction.

On the other hand, the secondary current I2 does not flow during the ON time of the bidirectional switch 20 and jumps up highly when the bidirectional switch 20 is turned off. In this way, in the first operation mode, similarly to the conventional flyback method, the peak value of the secondary current I2 becomes relatively large. However, as described above with reference to FIG. 4, the AC/DC converter 1 becomes the first operation mode only during the period in which |Vi|<|Vth| is satisfied, and hence a large problem does not occur.

Figure 8:
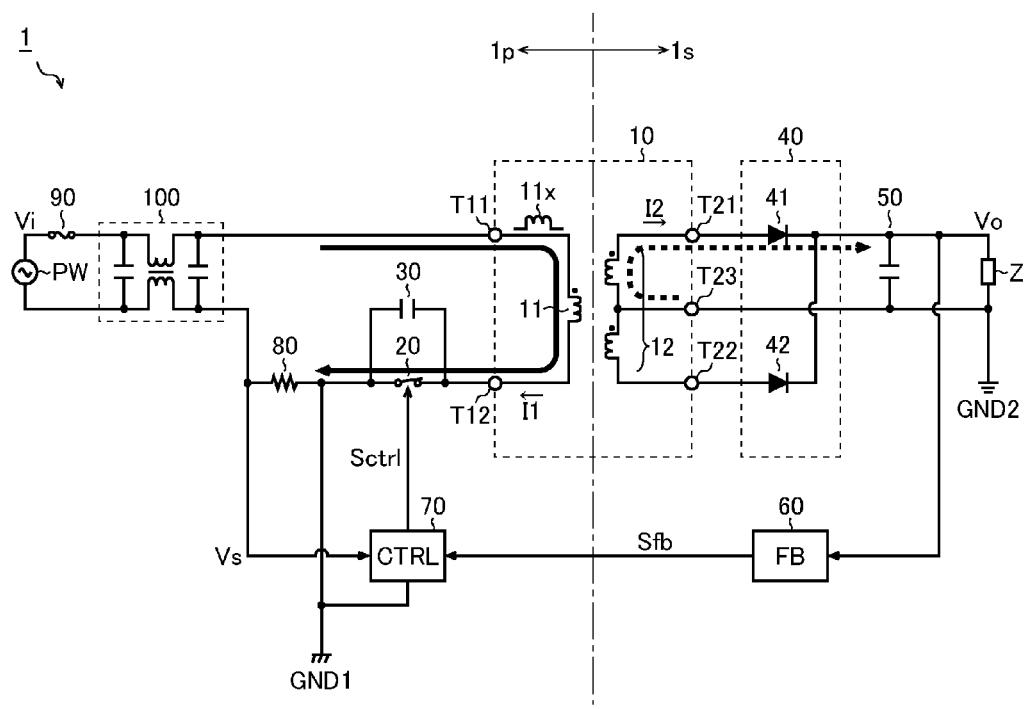
FIG. 8 is a circuit diagram illustrating a current path during a switch-on period in a second operation mode.

FIG. 8 is a circuit diagram illustrating a current path during the switch-on period in the second operation mode (the flyback method plus the forward method). During the ON period of the bidirectional switch 20, similarly to the first operation mode, the primary current I1 flows in the primary circuit system 1p, and hence energy is stored in the primary winding 11. For example, when the AC input voltage Vi is positive (T11>T12), the primary current I1 flows in the direction from the AC power source PW to the primary winding 11, to the bidirectional switch 20, and to the AC power source PW, as illustrated by a thick solid line arrow in this diagram.

In addition, in the second operation mode, during the ON period of the bidirectional switch 20, an induced voltage (called the forward voltage in this description) is generated in the secondary winding 12, and hence the secondary current I2 flows in the secondary circuit system 1s. Specifically, as illustrated by a thick broken line arrow in this diagram, the secondary current I2 flows in the direction from the secondary winding 12 (the first tap T21) to the diode 41, to the load Z, and to the secondary winding 12 (the center tap T23).

Figure 9:
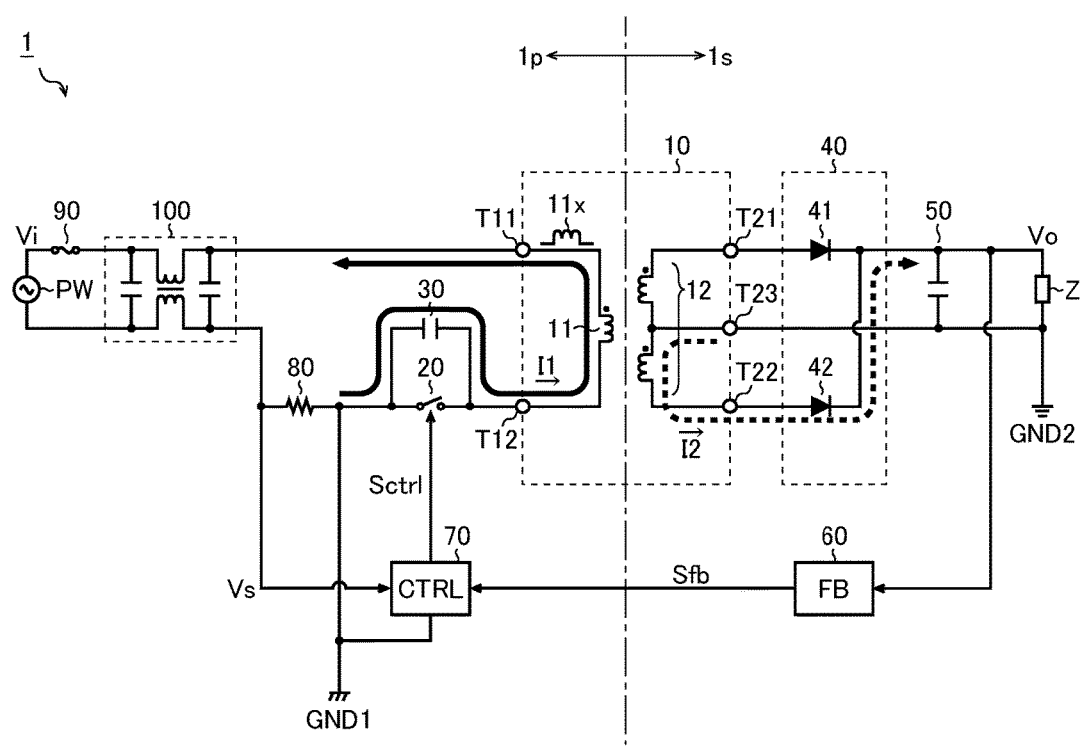
FIG. 9 is a circuit diagram illustrating a current path during a switch-off period in the second operation mode.

FIG. 9 is a circuit diagram illustrating a current path during the switch-off period in the second operation mode (the flyback method plus the forward method). During the OFF period of the bidirectional switch 20, similarly to the first operation mode, an induced voltage (i.e. a flyback voltage) is generated in the secondary winding 12 magnetically coupled to the primary winding 11, and hence the secondary current I2 flows in the secondary circuit system 1s. Specifically, as illustrated by a thick broken line arrow in this diagram, the secondary current I2 flows in the direction from the secondary winding 12 (the second tap T22) to the diode 42, to the load Z, and to the secondary winding 12 (the center tap T23).

In addition, when the bidirectional switch 20 is turned off, LLC resonant by the resonant capacitor 30 is generated in the primary circuit system 1p. As a result, as illustrated by a thick solid line arrow in this diagram, the primary current I1 flows in the opposite direction to the just previous switch-on period. This point is also the same as the first operation mode described above.

Figure 10:
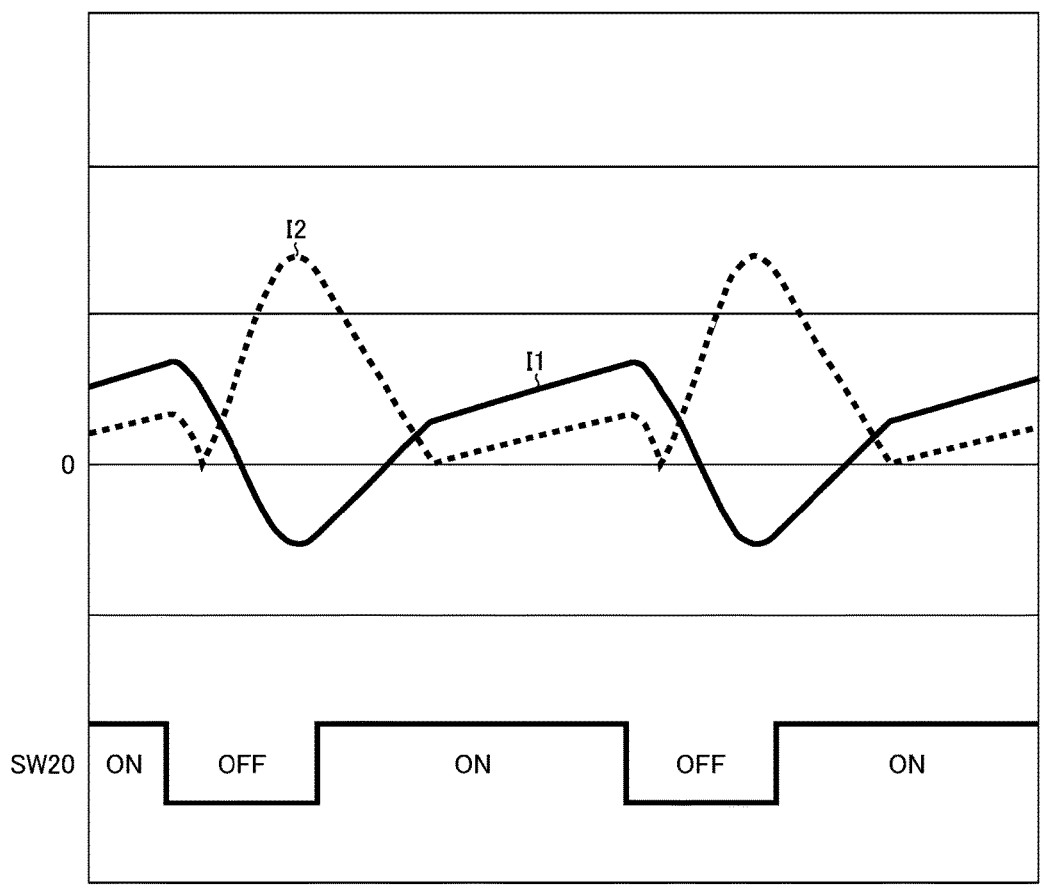
FIG. 10 is a waveform diagram illustrating current behavior in the second operation mode.

FIG. 10 is a waveform diagram illustrating current behavior in the second operation mode (the flyback method plus the forward method). Similarly to the above description with reference to FIG. 7, a solid line indicates the primary current I1, while a broken line indicates the secondary current I2. In addition, this diagram also illustrates current behavior when the AC input voltage Vi is positive (T11>T12).

As illustrated in this diagram, behavior of the primary current I1 is basically the same as that in the first operation mode (FIG. 7). In other words, the primary current I1 flows in the positive direction during the ON period of the bidirectional switch 20, while it flows in the negative direction during the OFF period of the bidirectional switch 20.

On the other hand, behavior of the secondary current I2 is largely different from that in the first operation mode (FIG. 7) in that it flows not only during the OFF period of the bidirectional switch 20 but also during the ON period of the bidirectional switch 20. In addition, when the secondary current I2 flows during the ON period of the bidirectional switch 20, energy stored in the primary winding 11 is decreased corresponding to the amount. As a result, it is understood that peak value of the secondary current I2 generated when the bidirectional switch 20 is turned off is controlled to be lower than that in the first operation mode (FIG. 7).

In this way, the AC/DC converter 1 that uses both the flyback method and the forward method can take out both the forward voltage and the flyback voltage generated in the secondary winding 12 as the output. Therefore, it is possible to solve the drawback of the flyback method that the peak value of the secondary current I2 is high, and to directly convert the AC input voltage Vi into the DC output voltage Vo with high efficiency also when being applied to a middle or high power.

Note that many AC/DC converters, which directly convert the AC input voltage Vi into the DC output voltage Vo, are conventionally proposed, but none of them realizes the use of both the flyback method and the forward method. It is clear from this fact that the AC/DC converter 1 of this embodiment is not a simple combination of existing circuits but is a novel circuit topology invented by earnest study by the inventors.

Second Embodiment

Figure 11:
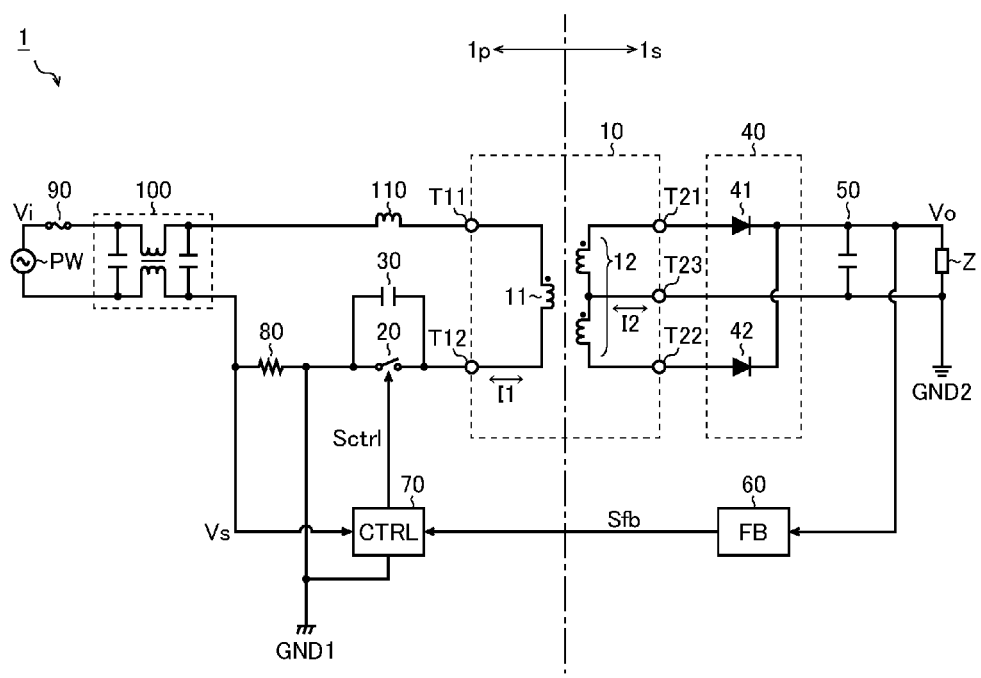
FIG. 11 is a circuit diagram illustrating a second embodiment of the AC/DC converter.

FIG. 11 is a circuit diagram illustrating a second embodiment of the AC/DC converter 1. The AC/DC converter 1 of this embodiment is based on the first embodiment (FIGS. 1A to 1C), and instead of using the leakage transformer or the resonant transformer as the transformer 10, a coil 110 corresponding to the leakage inductance 11x is additionally connected externally between the first tap T11 of the primary winding 11 and the filter circuit 100.

By adopting this structure, the same action and effect as the first embodiment can be obtained, and hence it is possible to directly convert the AC input voltage Vi into the DC output voltage Vo with high efficiency also when being applied to a middle or high power.

Third Embodiment

Figure 12:
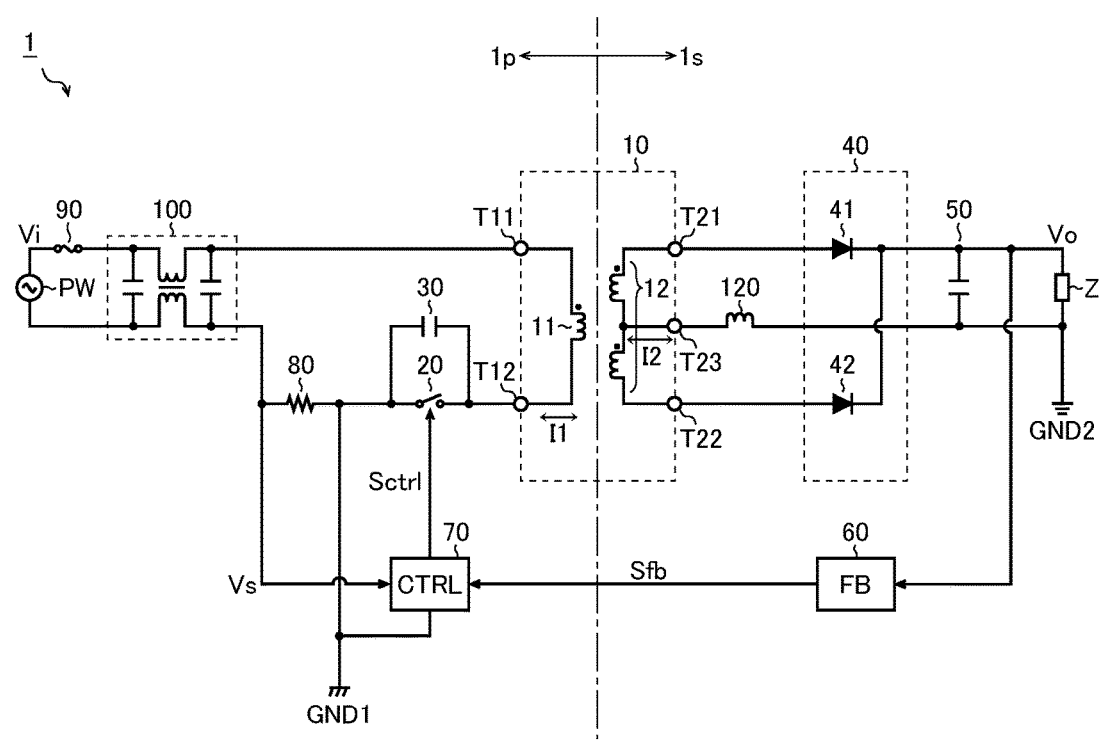
FIG. 12 is a circuit diagram illustrating a third embodiment of the AC/DC converter.

FIG. 12 is a circuit diagram illustrating a third embodiment of the AC/DC converter 1. The AC/DC converter 1 of this embodiment is based on the first embodiment (FIGS. 1A to 1C), and instead of using the leakage transformer or the resonant transformer as the transformer 10, a coil 120 corresponding to the leakage inductance 11x is additionally connected externally between the center tap T23 of the secondary winding 12 and the secondary side common GND2.

By adopting this structure, the same action and effect as the first embodiment and the second embodiment can be obtained, and hence it is possible to directly convert the AC input voltage Vi into the DC output voltage Vo with high efficiency also when being applied to a middle or high power.

Figure 13:
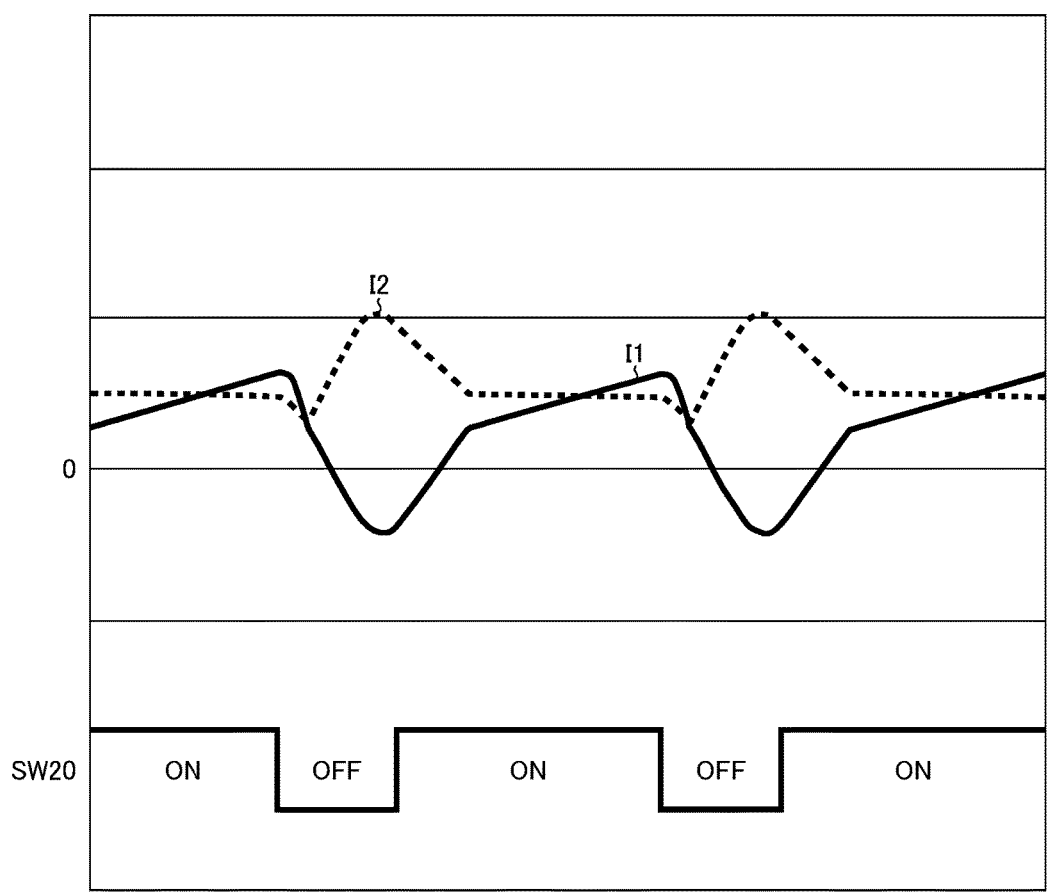
FIG. 13 is a waveform diagram illustrating current behavior in the second operation mode.

In addition, it is clear from comparison between FIG. 10 and FIG. 13 that the AC/DC converter 1 of the third embodiment can further decrease the secondary current I2 during the OFF period of the bidirectional switch 20 in the second operation mode (the flyback method plus the forward method), and can further increase the secondary current I2 during the ON period of the bidirectional switch 20.

In particular, in the AC/DC converter 1 of this embodiment, the secondary current I2 does not become lower than 0 A also during the switch-on period in the second mode, and the secondary circuit system 1s can operate in a current continuous mode.

Note that, as a variation of this embodiment, it is possible to connect the coil 120 to the first tap T21 or the second tap T22 of the secondary winding 12. However, it is found from a simulation that it is desired to connect the coil 120 between the center tap T23 of the secondary winding 12 and the secondary side common GND2 in order to fully obtain the above-mentioned effect.

Fourth Embodiment

Figure 14:
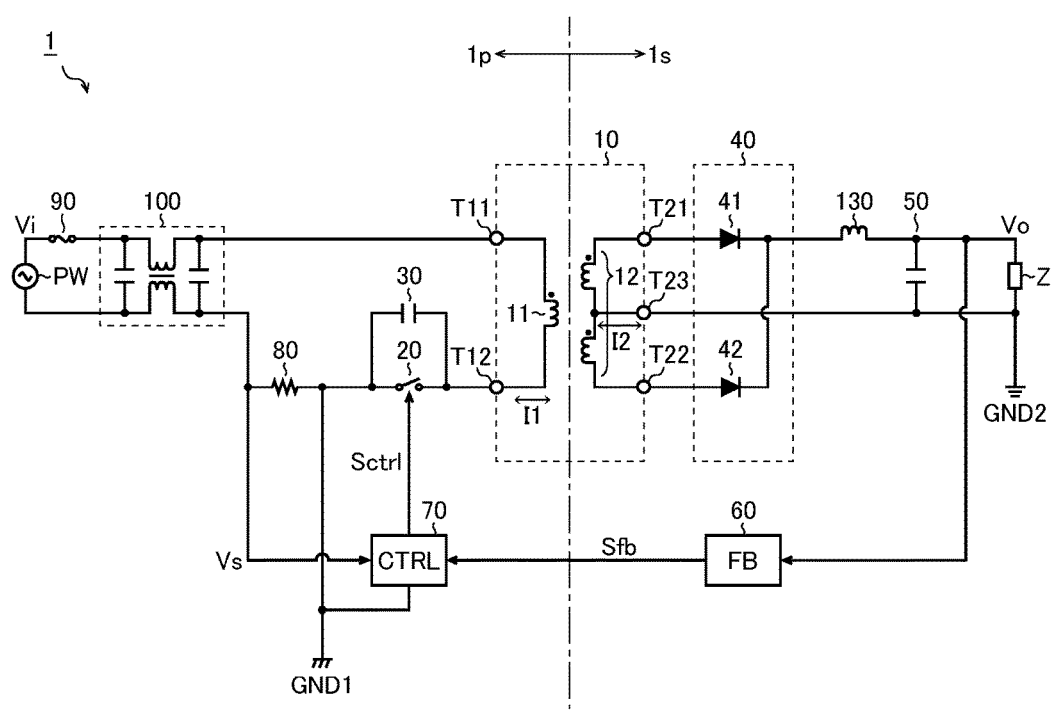
FIG. 14 is a circuit diagram illustrating a fourth embodiment of the AC/DC converter.

FIG. 14 is a circuit diagram illustrating a fourth embodiment of the AC/DC converter 1. The AC/DC converter 1 of this embodiment is based on the first embodiment (FIGS. 1A to 1C), and instead of using the leakage transformer or the resonant transformer as the transformer 10, a coil 130 corresponding to the leakage inductance 11x is additionally connected externally between the output terminal of the full-wave rectification circuit 40 and the output terminal of the DC output voltage Vo.

By adopting this structure, the same action and effect as the first to third embodiments can be obtained, and hence it is possible to directly convert the AC input voltage Vi into the DC output voltage Vo with high efficiency also when being applied to a middle or high power.

In particular, the AC/DC converter 1 of this embodiment can use the coil 130 also as the choke coil.

Note that, each of the first to fourth embodiments described above may be implemented solely, or they may be arbitrarily combined to be implemented. For example, when the first embodiment (FIGS. 1A to 1C) and the second embodiment (FIG. 11) are combined, the leakage transformer or the resonant transformer is used as the transformer 10, and the coil 110 is connected in series to the primary winding 11. In addition, for example, when the second embodiment (FIG. 11) and the third embodiment (FIG. 12) are combined, the coils 110 and 120 are externally connected respectively on the primary side and on the secondary side of the transformer 10.

Fifth Embodiment

Figure 15:
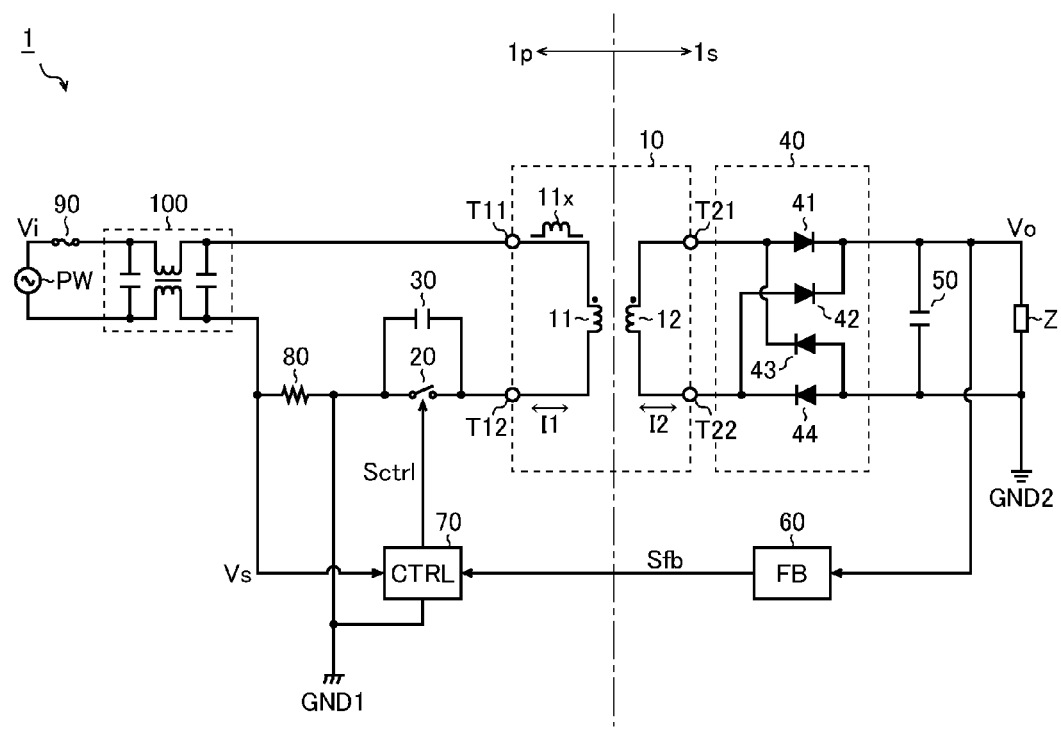
FIG. 15 is a circuit diagram illustrating a fifth embodiment of the AC/DC converter.

FIG. 15 is a circuit diagram illustrating a fifth embodiment of the AC/DC converter 1. The AC/DC converter 1 of this embodiment is based on the first embodiment (FIGS. 1A to 1C) and has a feature in which the center tap T23 of the secondary winding 12 is eliminated, and the full-wave rectification circuit 40 is constituted of a diode bridge.

Diodes 43 and 44 are added to the full-wave rectification circuit 40 as it is constituted of a diode bridge. The cathode of the diode 43 is connected to the first tap T21 of the secondary winding 12. The cathode of the diode 44 is connected to the second tap T22 of the secondary winding 12. The anode of the diode 43 and the anode of the diode 44 are both connected to the secondary side common GND2.

Note that, when a positive induced voltage is generated in the secondary winding 12 (T21>T22), the diodes 41 and 44 are forward biased, while the diodes 42 and 43 are reverse biased. Therefore the secondary current I2 flows in the current path from the secondary winding 12 to the diode 41, to the load Z, to the diode 44, and to the secondary winding 12. On the other hand, if a negative induced voltage is generated in the secondary winding 12 (T21<T22), the diodes 41 and 44 are reverse biased, while the diodes 42 and 43 are forward biased. Therefore the secondary current I2 flows in the current path from the secondary winding 12 to the diode 42, to the load Z, to the diode 43, and to the secondary winding 12.

Note that FIG. 15 illustrates an application example based on the first embodiment, but application targets of this embodiment are not limited to this. Any one of the first to fourth embodiments described above or a combination of them can be used as a base.

<Bidirectional Switch>

Figure 16:
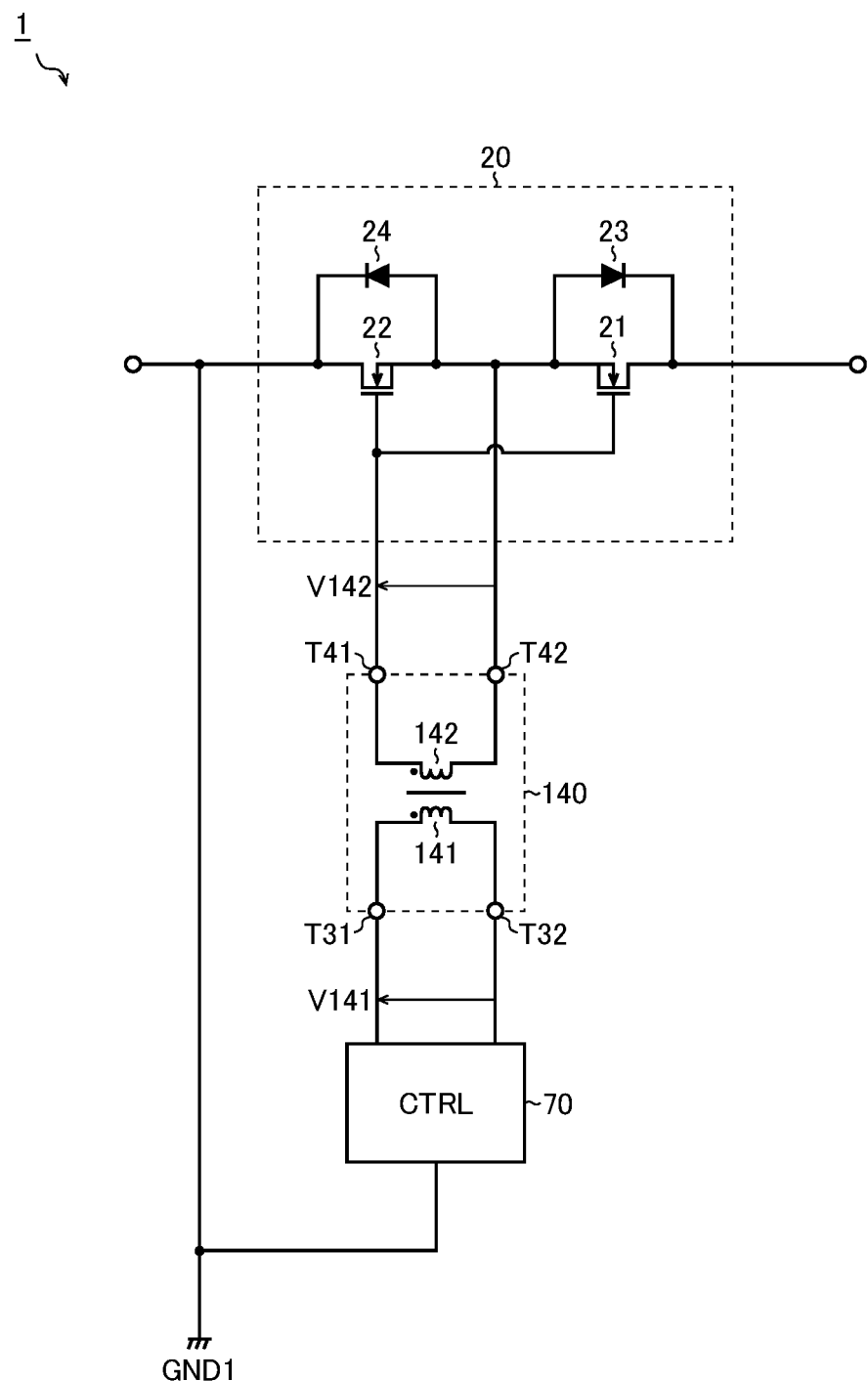
FIG. 16 is a circuit diagram illustrating a structural example of a bidirectional switch.

FIG. 16 is a circuit diagram illustrating a structural example of the bidirectional switch 20. The bidirectional switch 20 of this structural example includes N-channel MOS field-effect transistors 21 and 22. The control circuit 70 drives the transistors 21 and 22 (thus bidirectional switch 20) via a pulse transformer 140. The pulse transformer 140 includes a primary winding 141 and a secondary winding 142 that is electromagnetically coupled to the primary winding 141 in the same polarity. Note that, a first tap T31 and a second tap T32 of the primary winding 141 are connected to the control circuit 70.

The drain of the transistor 21 corresponds to the first terminal of the bidirectional switch 20, and the drain of the transistor 22 corresponds to the second terminal of the bidirectional switch 20. Gates of the transistors 21 and 22 are both connected to the first tap T41 of the secondary winding 142. A source and a back gate of the transistor 21, and a source and a back gate of the transistor 22 are all connected to the second tap T42 of the secondary winding 142.

In addition, parasitic diodes 23 and 24 are formed between source and drain of the transistors 21 and 22, respectively, in the illustrated polarities. Specifically, the cathode of the parasitic diode 23 is connected to the drain of the transistor 21. The anode of the parasitic diode 23 is connected to the source of the transistor 21. The cathode of the parasitic diode 24 is connected to the drain of the transistor 22. The anode of the parasitic diode 24 is connected to the source of the transistor 22.

When the control circuit 70 applies a positive control voltage V141 (T31>T32) to the primary winding 141, a positive induced voltage V142 (T41>T42) is generated in the secondary winding 142. As a result, gate-source voltages of the transistors 21 and 22 respectively become higher than ON threshold voltages thereof, and hence the transistors 21 and 22 are turned on. This state corresponds to the state where the bidirectional switch 20 is turned on.

On the other hand, when the control circuit 70 applies a negative control voltage V141 (T31<T32) to the primary winding 141, a negative induced voltage V142 (T41<T42) is generated in the secondary winding 142. As a result, gate-source voltages of the transistors 21 and 22 respectively become lower than ON threshold voltages thereof, and hence the transistors 21 and 22 are turned off. This state corresponds to the state where the bidirectional switch 20 is turned off.

In this way, with the structure in which the bidirectional switch 20 is driven via the pulse transformer 140, the control circuit 70 can be insulated from the primary circuit system 1p to which a high voltage is applied, and hence lower withstand voltage of the control circuit 70 can be realized.

However, in an application where a high voltage is not applied to the primary circuit system 1p, it is possible to use a CMOS analog switch (so-called CMOS transfer gate) in which a PMOSFET and an NMOSFET are connected in parallel as the bidirectional switch 20.

In addition, by using a GaN power device or the like having no parasitic diode, the bidirectional switch 20 can be constituted of a single switching element.

Capacitor Voltage Divider Circuit (First Example)

Figure 17:
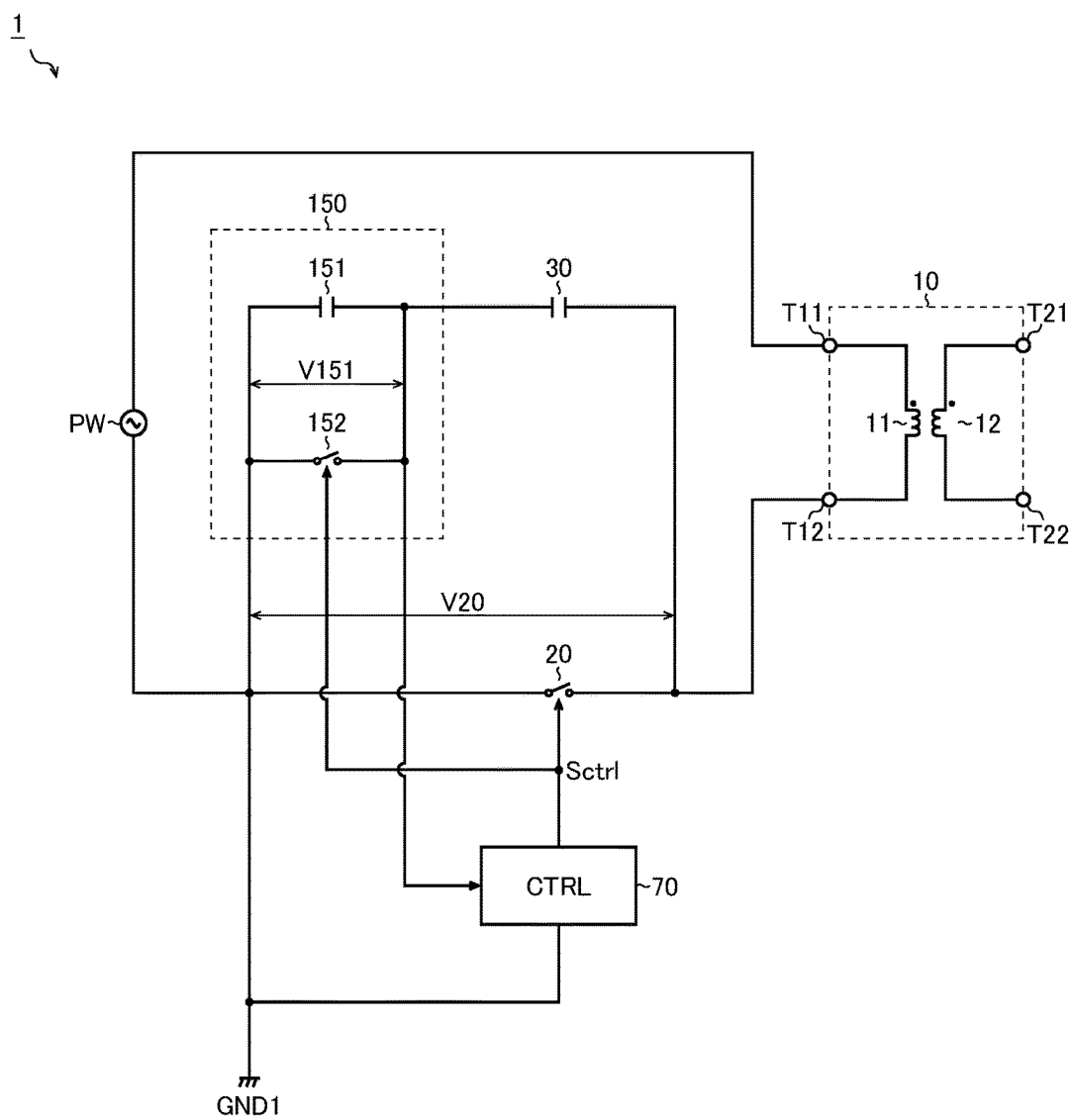
FIG. 17 is a circuit diagram illustrating a first example of a capacitor voltage divider circuit.

FIG. 17 is a circuit diagram illustrating a first example of a capacitor voltage divider circuit. A capacitor voltage divider circuit 150 of this example is a circuit portion that divides a voltage V20 across both ends of the bidirectional switch 20 so as to generate a divided voltage V151, and it includes a first capacitor 151 and a discharge switch 152.

A first terminal of the first capacitor 151 is connected to the second terminal of the bidirectional switch 20 (i.e. the primary side common GND1). A second terminal of the first capacitor 151 is connected to a first terminal of the resonant capacitor 30. A second terminal of the resonant capacitor 30 is connected to the first terminal of the bidirectional switch 20 (i.e. the second tap T12 of the primary winding 11).

In this way, the first capacitor 151 is connected in series to the resonant capacitor 30, and the divided voltage V151 is output from a connection node between the resonant capacitor 30 and the first capacitor 151. In other words, in the capacitor voltage divider circuit 150 of this example, the resonant capacitor 30 functions as a part of the capacitor voltage divider circuit 150.

It is supposed that a capacitance of the resonant capacitor 30 is C30, and a capacitance of the first capacitor 151 is C151. Then, the divided voltage V151 is expressed by the following equation (4).

$$V151 = V20 \times C30/(C30+C151) \qquad (4)$$

Therefore, by appropriately selecting capacitance values of the resonant capacitor 30 and the first capacitor 151 so that C30<<C151 is satisfied, it is possible to generate the divided voltage V151 that is within an input dynamic range of the control circuit 70.

In particular, the capacitor voltage divider circuit 150 of this example does not use a resister that advances the phase of a detected signal, and hence an additional delay circuit is not necessary. In addition, a power loss in the resister is not generated.

Note that, the control circuit 70 that receives input of the divided voltage V151 has a software switching function of turning on the bidirectional switch 20 according to the timing when the divided voltage V151 becomes 0 V (i.e. a ZVS function). With this software switching function, as described above, it is possible to decrease a switching loss due to the parasitic capacitor of the bidirectional switch 20 and the resonant capacitor 30, and hence conversion efficiency of the AC/DC converter 1 can be improved.

The discharge switch 152 is connected in parallel to the first capacitor 151. The discharge switch 152 is turned on and off based on the control signal Sctrl input from the control circuit 70 in synchronization with the bidirectional switch 20. More specifically, the discharge switch 152 is turned on during the ON period of the bidirectional switch 20 and is turned off during the OFF period of the bidirectional switch 20.

In other words, in the capacitor voltage divider circuit 150 of this example, both ends of the first capacitor 151 are short-circuited so that the divided voltage V151 is initialized to 0 V every time when the bidirectional switch 20 is turned on. Therefore, when the bidirectional switch 20 is switched from ON to OFF, the divided voltage V151 changes always from 0 V.

As a result, the control circuit 70 can detect zero cross timing of the divided voltage V151 (thus ON timing of the bidirectional switch 20) with high accuracy, by simply comparing the divided voltage V151 with a predetermined threshold value voltage (0 V or an adjacent value), without considering an offset of the divided voltage V151 accompanying the resonance operation.

Figure 18:
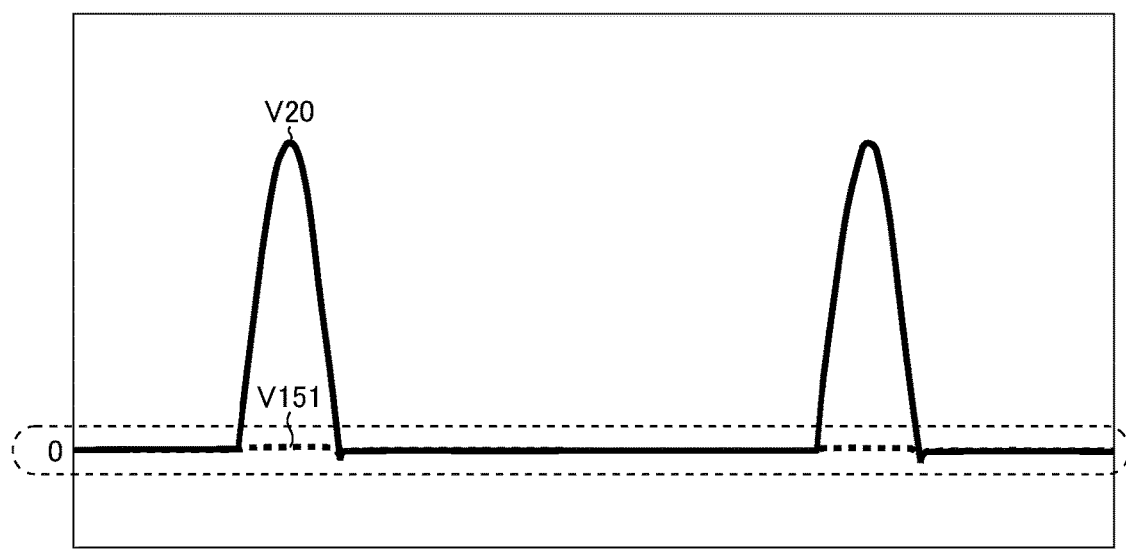
FIG. 18 is a waveform diagram illustrating an example of a voltage resonant waveform.
Figure 19:
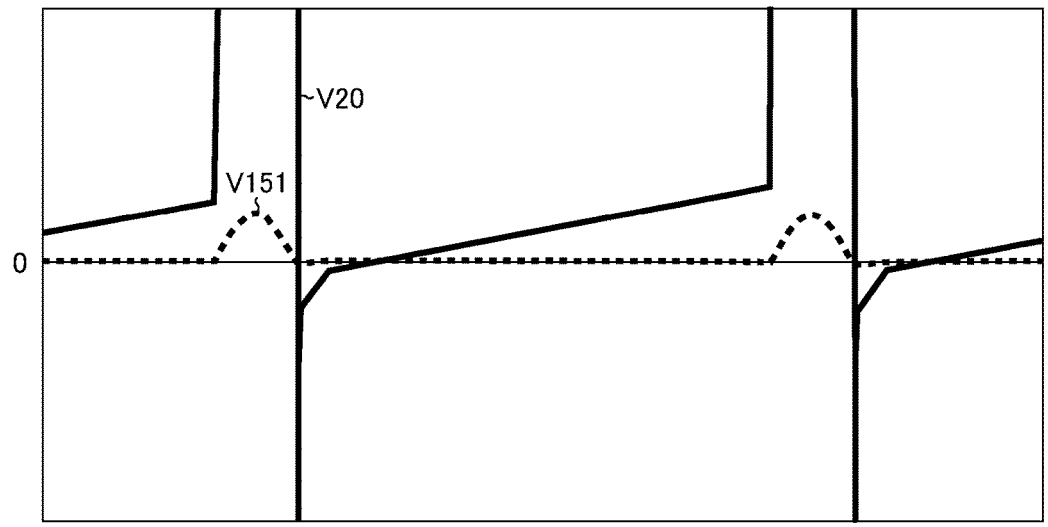
FIG. 19 is a waveform diagram illustrating an example of a divided voltage waveform.

FIG. 18 is a waveform diagram illustrating an example of the voltage resonant waveform, and FIG. 19 is a waveform diagram illustrating an example of the divided voltage waveform (i.e. an enlarged diagram of the broken line area in FIG. 18). Note that, in both diagrams, the solid line indicates the voltage V20 across both ends of the bidirectional switch 20, and the broken line indicates the divided voltage V151.

In the resonance operation (i.e. when the bidirectional switch 20 is off), in general, the voltage V20 across both ends of the bidirectional switch 20 becomes a high voltage exceeding a few hundred volts to 1000 volts. Therefore, it is difficult to directly input the voltage V20 across both ends of the bidirectional switch 20 to the control circuit 70 for monitoring.

On the other hand, the divided voltage V151 generated by the capacitor voltage divider circuit 150 can be within the input dynamic range of the control circuit 70, and hence it is possible to directly input it to the control circuit 70. In particular, the waveform of the voltage V20 across both ends and the waveform of the divided voltage V151 are similar to each other. Therefore the control circuit 70 can detect the ON timing of the bidirectional switch 20 by monitoring the divided voltage V151.

Capacitor Voltage Divider Circuit (Second Example)

Figure 20:
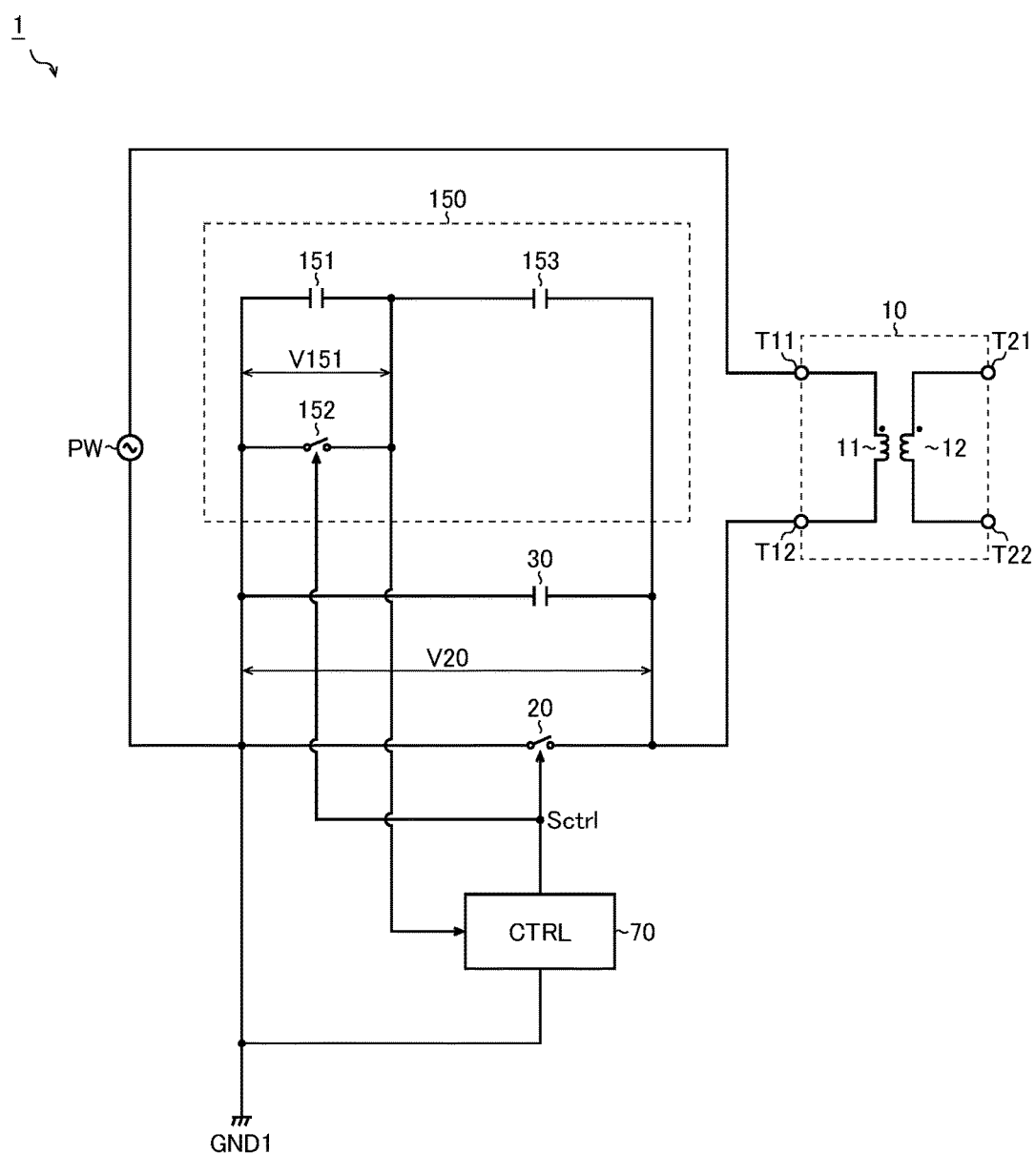
FIG. 20 is a circuit diagram illustrating a second example of the capacitor voltage divider circuit.

FIG. 20 is a circuit diagram illustrating a second example of the capacitor voltage divider circuit. The capacitor voltage divider circuit 150 of this example includes a second capacitor 153 in addition to the first capacitor 151 and the discharge switch 152 described above. Further, along with addition of the second capacitor 153, connection relationships of the first capacitor 151 and the resonant capacitor 30 are partially changed.

The first terminal of the first capacitor 151 and the first terminal of the resonant capacitor 30 are both connected to the second terminal of the bidirectional switch 20 (i.e. the primary side common GND1). The second terminal of the first capacitor 151 is connected to a first terminal of the second capacitor 153. A second terminal of the second capacitor 153 and the second terminal of the resonant capacitor 30 are both connected to the first terminal of the bidirectional switch 20 (i.e. the second tap T12 of the primary winding 11).

In this way, the first capacitor 151 and the second capacitor 153 are connected in series to each other between both ends of the bidirectional switch 20, and the divided voltage V151 is output from a connection node between the first capacitor 151 and the second capacitor 153. In other words, in the capacitor voltage divider circuit 150 of this example, the series capacitor circuit constituted of the first capacitor 151 and the second capacitor 153 is connected in parallel to the resonant capacitor 30.

It is supposed that a capacitance of the first capacitor 151 is C151, and a capacitance of the second capacitor 153 is C153. Then, the divided voltage V151 is expressed by the following equation (5).

$$V151 = V20 \times C153/(C151+C153) \quad (5)$$

Therefore, by appropriately selecting capacitance values of the first capacitor 151 and the second capacitor 153 so that C153<<C151 is satisfied, it is possible to generate the divided voltage V151 that is within the input dynamic range of the control circuit 70.

The capacitor voltage divider circuit 150 of this example does not use a resister that advances the phase of the detected signal similarly to the first example (FIG. 17) described above, and hence an additional delay circuit is not necessary. In addition, a power loss in the resister is not generated.

In addition, as the resonant capacitor 30 is separated from the capacitor voltage divider circuit 150, the capacitor voltage divider circuit 150 of this example can arbitrarily set a voltage division ratio without depending on the capacitance of the resonant capacitor 30.

Note that, the discharge switch 152 is connected in parallel to the first capacitor 151 and is turned on and off in synchronization with the bidirectional switch 20. This is the same as the first example (FIG. 17) described above and can contribute to improvement of accuracy of detecting the ON timing of the bidirectional switch 20.

Driving Circuit (First Example)

Figure 21:
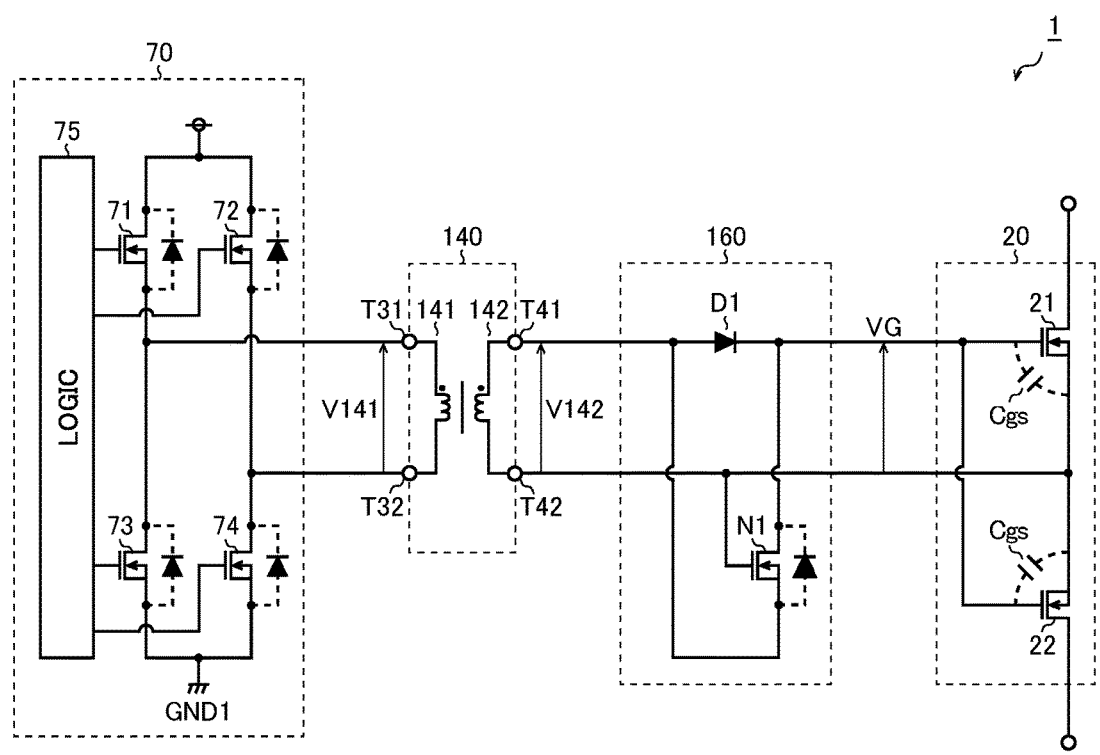
FIG. 21 is a circuit diagram illustrating a first example of a driving circuit.

FIG. 21 is a circuit diagram illustrating a first example of the driving circuit. A driving circuit 160 of this example is a circuit portion that drives a gate voltage VG of the transistors 21 and 22 so as to turn on and off the transistors 21 and 22, by charging and discharging a parasitic capacitor Cgs between gate and source of the transistors 21 and 22 (corresponding to MOS switches) according to the induced voltage V142 generated in the secondary winding 142 of the pulse transformer 140. The driving circuit 160 includes a diode D1 and an N-channel MOS field-effect transistor N1.

The anode of the diode D1 and the source of the transistor N1 are both connected to the first tap T41 of the secondary winding 142. The cathode of the diode D1 and the drain of the transistor N1 are both connected to gates of the transistors 21 and 22. The gate of the transistor N1 is connected to the second tap T42 of the secondary winding 142. Note that the second tap T42 of the secondary winding 142 is connected also to sources of the transistors 21 and 22. In addition, a parasitic diode is formed between source and drain of the transistor N1 in the illustrated polarity.

The diode D1 is forward biased when the induced voltage V142 is positive (T41>T42), while it is reverse biased when the induced voltage V142 is negative (T41<T42). Therefore, the diode D1 functions as means for raising the gate voltage VG to a high level according to the positive induced voltage V142.

The transistor N1 is turned off when the induced voltage V142 is positive, while it is turned on when the induced voltage V142 is negative. Therefore, the transistor N1 functions as means for dropping the gate voltage VG to a low level according to the negative induced voltage V142.

Next, prior to detailed description of the driving circuit 160, structure and operation of the control circuit 70 is briefly described.

The control circuit 70 of this structural example includes N-channel MOS field-effect transistors 71 to 74 and a logic portion 75. Drains of the transistors 71 and 72 are both connected to the power supply terminal. The source of the transistor 71 and the drain of the transistor 73 are both connected to the first tap T31 of the primary winding 141. The source of the transistor 72 and the drain of the transistor 74 are both connected to the second tap T32 of the primary winding 141. Sources of the transistors 73 and 74 are both connected to the primary side common GND1. Note that, parasitic diodes are formed between source and drain of the transistors 71 to 74 in illustrated polarities. In this way, the control circuit 70 of this structural example uses the transistors 71 to 74 to form the full bridge type signal output portion.

The logic portion 75 drives each gate of the transistors 71 to 74, so as to apply the control voltage V141 to the primary winding 141 of the pulse transformer 140. For example, the logic portion 75 turns on the transistors 71 and 74, and turns off the transistors 72 and 73, so as to apply the positive control voltage V141 (T31>T32) to the primary winding 141. On the other hand, the logic portion 75 turns off the transistors 71 and 74, and turns on the transistors 72 and 73, so as to apply the negative control voltage V141 (T31<T32) to the primary winding 141. In this way, the primary winding 141 of the pulse transformer 140 is pulse-driven using the full bridge type signal output portion.

Note that, although it is not clearly illustrated in this diagram, a bootstrap should be disposed as the power supply to the logic portion 75. In addition, it is possible to insert a parallel RC portion, or a series circuit constituted of the parallel RC portion and a resistor between the control circuit 70 and the pulse transformer 140.

In addition, as to characteristics of the pulse transformer 140, the coupling coefficient K is 0.99, inductance L1 of the primary winding 141 is 1 mH, and inductance L2 of the secondary winding 142 is 1.3 mH, for example.

Figure 22:
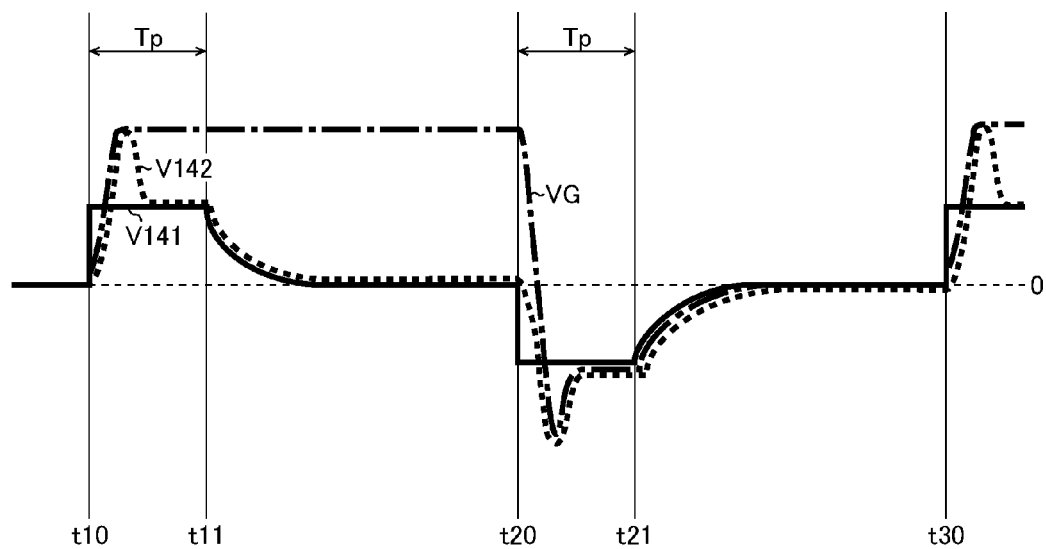
FIG. 22 is a waveform diagram illustrating voltage behaviors of individual portions in the first example.

Next, gate drive operation by the driving circuit 160 is described in detail with reference to FIG. 22. FIG. 22 is a waveform diagram illustrating voltage behaviors of the individual portions in the first example. In this diagram, a solid line indicates the control voltage V141, a broken line indicates the induced voltage V142, and a dot-dashed line indicates the gate voltage VG. Note that the control voltage V141 is a voltage having the reference point (0 V) at the second tap T32 of the primary winding 141. On the other hand, the induced voltage V142 and the gate voltage VG are voltages having the reference point (0 V) at the second tap T42 of the secondary winding 142.

When the positive control voltage V141 (T31>T32) is applied to the primary winding 141 at time point t10, the positive induced voltage V142 (T41>T42) is generated in the secondary winding 141 by the forward operation of the pulse transformer 140. Therefore, the diode D1 becomes forward biased. In addition, when the induced voltage V142 is positive, the gate of the transistor N1 has a lower potential than the source. Therefore the transistor N1 remains to be off.

As a result, current flows in the path from the secondary winding 142 (the first tap T41) to the diode D1 (or the parasitic diode of the transistor N1), to the parasitic capacitor Cgs, and to the secondary winding 142 (second tap T42), and hence the parasitic capacitor Cgs is charged in the positive direction. This state corresponds to the state where the gate voltage VG is raised to the high level.

Note that, when the positive control voltage V141 is applied, a positive whisker-like surge is transiently generated in the induced voltage V142. As a result, along with the transition to the high level, the gate voltage VG is increased to be close to a positive peak value of the whisker-like surge.

Along with convergence of the transient response described above, the induced voltage V142 becomes lower than the gate voltage VG, and hence the diode D1 becomes reverse biased. In addition, as long as the induced voltage V142 is positive, the transistor N1 remains to be off. Therefore the charge and discharge path for the parasitic capacitor Cgs is broken. As a result, also after the induced voltage V142 is stabilized to a steady-state value, the gate voltage VG is maintained to be close to the positive peak value of the whisker-like surge.

After that, at time point t11 when pulse time Tp is elapsed from the time point t10, application of the positive control voltage V141 to the primary winding 141 is stopped, and hence the induced voltage V142 is not generated in the secondary winding 142. In this case, the diode D1 remains to be reverse biased, and the transistor N1 remains to be off. Therefore the charge and discharge path of the parasitic capacitor Cgs is remained to be broken also after the time point tn.

Here, because the parasitic capacitor Cgs has a relatively large capacitance (approximately 2000 pF), the charge stored by the previous charging can be kept for a long period. As a result, the gate voltage VG is remained to be the high level without changing also after the time point tn.

When the negative control voltage V141 (T31<T32) is applied to the primary winding 141 at time point t20, the negative induced voltage V142 (T41<T42) is generated in the secondary winding 141 by the forward operation of the pulse transformer 140. In this case, the diode D1 remains to be reverse biased. On the other hand, the transistor N1 is turned on at a timing when the gate-source voltage becomes higher than the ON threshold voltage.

As a result, current flows in the path from the secondary winding 142 (the second tap T42) to the parasitic capacitor Cgs, to the transistor N1, and to the secondary winding 142 (the first tap T41), and hence the parasitic capacitor Cgs is charged in the negative direction. This state corresponds to the state where the gate voltage VG is dropped to the low level.

Note that, when the negative control voltage V141 is applied, a negative whisker-like surge is transiently generated in the induced voltage V142. Therefore, along with the transition to the low level, the gate voltage VG is decreased to be close to negative peak value of the whisker-like surge.

However, unlike the case where the positive control voltage V141 is applied, the gate voltage VG is not kept to be close to the negative peak value of the whisker-like surge but changes following the induced voltage V142 along with the convergence of the transient response. This is because the transistor N1 remains to be on so that the charge and discharge path of the parasitic capacitor Cgs is not broken as long as the induced voltage V142 is negative.

After that, at time point t21 when the pulse time Tp is elapsed from the time point t20, application of the negative control voltage V141 to the primary winding 141 is stopped, and hence the induced voltage V142 is not generated in the secondary winding 142. In this case, the diode D1 remains to be reverse biased. In addition, the transistor N1 is turned off at a time point when the gate-source voltage becomes lower than the ON threshold voltage. By the series of operation described above, after the time point t21, the gate voltage VG becomes close to 0 V until the transistor N1 is turned off.

Also after time point t30, positive on trigger pulses (time point t10 to time point t11) and negative off trigger pulses (time points t20 to t21) are alternately generated as the control voltage V141, and hence the gate drive operation similar to the above description is repeated.

Figure 23:
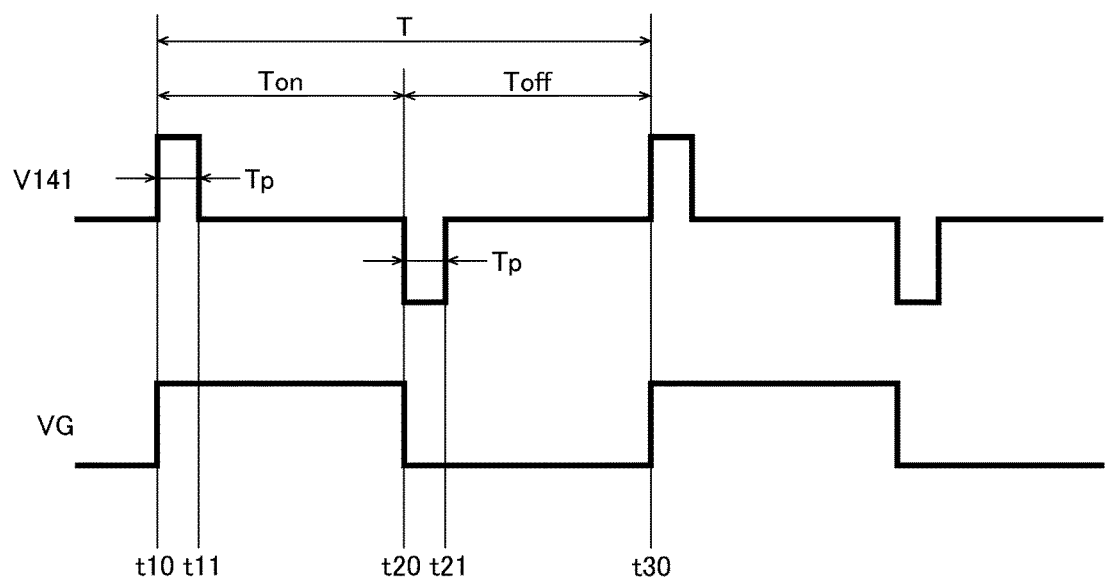
FIG. 23 is a timing chart illustrating an example of gate drive operation.

FIG. 23 is a timing chart illustrating an example of the gate drive operation by the driving circuit 160, in which the control voltage V141 and the gate voltage VG are shown in order from the upper part. Note that the time points t10 to t30 in this diagram correspond to the time points t10 to t30 in FIG. 22.

As illustrated in this diagram, application of the control voltage V141 is not repeated over an ON period Ton (i.e. t10 to t20) and an OFF period Toff (i.e. t20 to t30) but is stopped at a time point when the predetermined pulse time Tp (<Ton, <Toff) elapses.

The pulse time Tp (corresponding to the pulse width of the control voltage V141) described above is desired to be set to a minimum length necessary for charging and discharging the parasitic capacitor Cgs (i.e. a minimum length necessary for turning on and off the transistors 21 and 22, which is 1 μs, for example).

In this way, using the driving circuit 160 of this example, the parasitic capacitor Cgs can be utilized as a capacitor for keeping the gate voltage VG. Therefore, when driving the gates of the transistors 21 and 22, it is sufficient to momentarily apply the control voltage V141 at a rising timing or a falling timing in each of the ON period Ton and the OFF period Toff. Therefore the drive current flowing in the primary winding 141 can be minimized, and hence the current consumption can be reduced.

Note that, when the inductance of the primary winding 141 is decreased in order to decrease the rising time and the falling time of the induced voltage V142 generated in the secondary winding 142, the drive current flowing in the primary winding 141 is increased. However, because the period in which the drive current flows (i.e. the pulse time Tp) is very short, total current consumption is not so affected. Therefore it is possible to achieve both reduction of the current consumption and improvement of the responsiveness.

In particular, when high voltage withstand elements such as an SiC power device are used as the transistors 21 and 22, it is necessary to decrease the inductance of the primary winding 141 in order to increase the gate voltage VG to a necessary level. Therefore it is desired to minimize the period in which the drive current flows by adopting the driving circuit 160 of this example.

In addition, the positive on trigger pulse and the negative off trigger pulse in the control voltage V141 have the same pulse width (i.e. the pulse time Tp). Therefore, even if an on duty Don of the control voltage V141 (i.e. Ton/T×100%) is not 50%, unnecessary energy does not remain in the pulse transformer 140. Therefore, a reset circuit that discharges remaining energy is not necessary, and hence the circuit scale can be reduced.

In addition, the driving circuit 160 has a very simple circuit structure, and the center tap is not necessary on the secondary side of the pulse transformer 140. Therefore, an inexpensive transformer can be used as the pulse transformer 140, and thus cost can be reduced.

Driving Circuit (Second Example)

Figure 24:
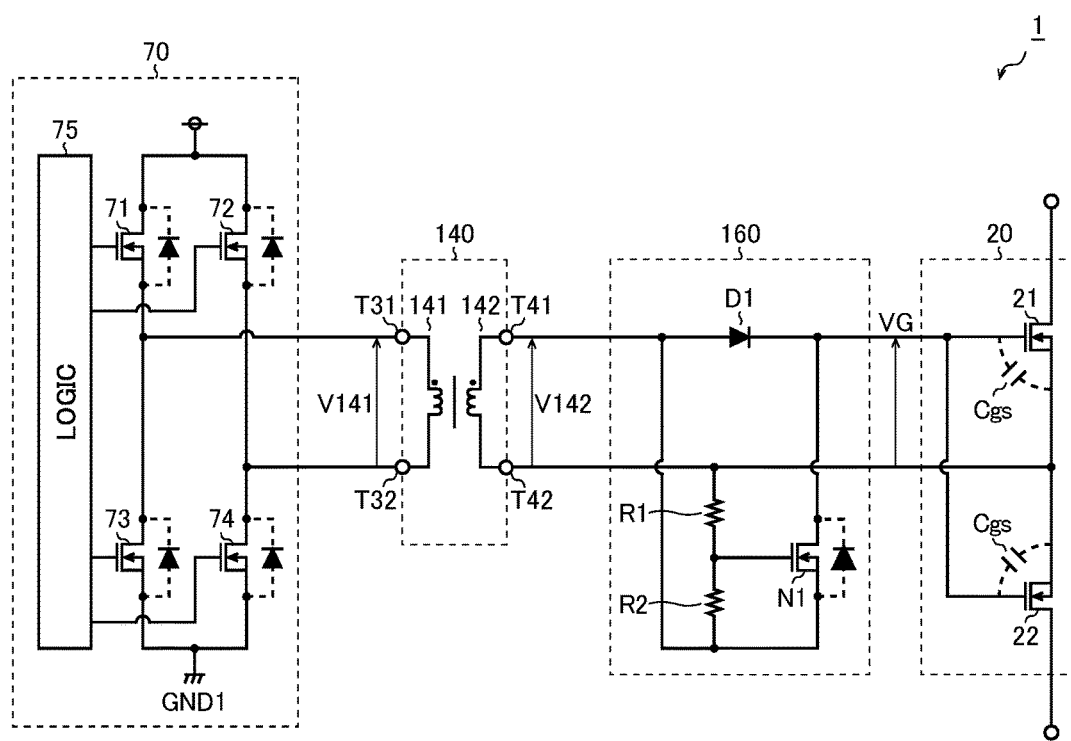
FIG. 24 is a circuit diagram illustrating a second example of the driving circuit.

FIG. 24 is a circuit diagram illustrating a second example of the driving circuit. The driving circuit 160 of this example is based on the first example (FIG. 21) described above and further includes resistors R1 and R2 connected in series between the first tap T41 of the secondary winding 142 and the second tap T42. In addition, as the resistors R1 and R2 are added, the gate of the transistor N1 is connected to a connection node between the resistor R1 and the resistor R2 instead of the second tap T42 of the secondary winding 142.

In the driving circuit 160 of this example, the divided voltage of the induced voltage V142 (i.e. −V142×(R2/(R1+R2))) is applied between gate and source of the transistor N1. Therefore, even if the induced voltage V142 becomes a little negative, the gate-source voltage of the transistor N1 does not exceed the ON threshold voltage, and hence it is possible to prevent the transistor N1 from being turned on erroneously.

For example, when the control voltage V141 is dropped from the high level to the low level at the time point t11 in FIG. 22, even if the induced voltage V142 transiently becomes negative, the transistor N1 is hardly turned on erroneously. Therefore, unintentional discharge of the parasitic capacitor Cgs can be prevented.

Driving Circuit (Third Example)

Figure 25:
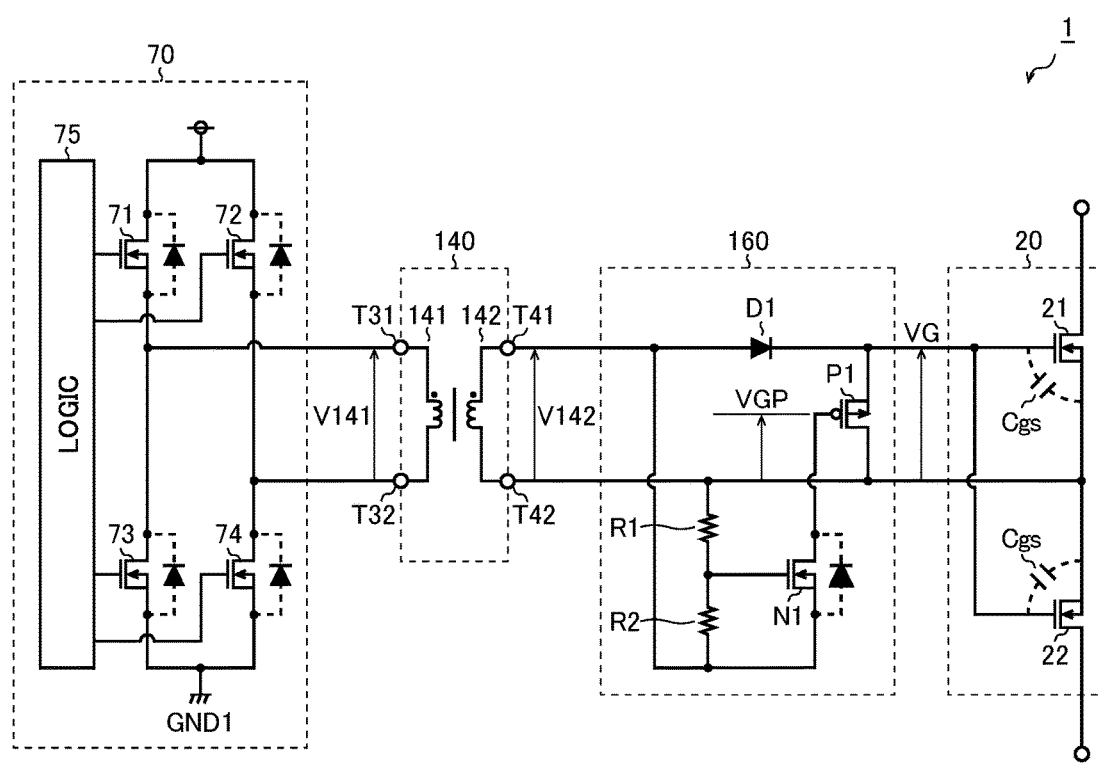
FIG. 25 is a circuit diagram illustrating a third example of the driving circuit.

FIG. 25 is a circuit diagram illustrating a third example of the driving circuit. The driving circuit 160 of this example is based on the second example (FIG. 24) described above and further includes a P-channel MOS field-effect transistor P1. The source of the transistor P1 is connected to gates of the transistors 21 and 22. The drain of the transistor P1 is connected to the second tap T42 of the secondary winding 142. In addition, as the transistor P1 is added, the drain of the transistor N1 is connected to the gate of the transistor P1 instead of the gates of the transistors 21 and 22.

Figure 26:
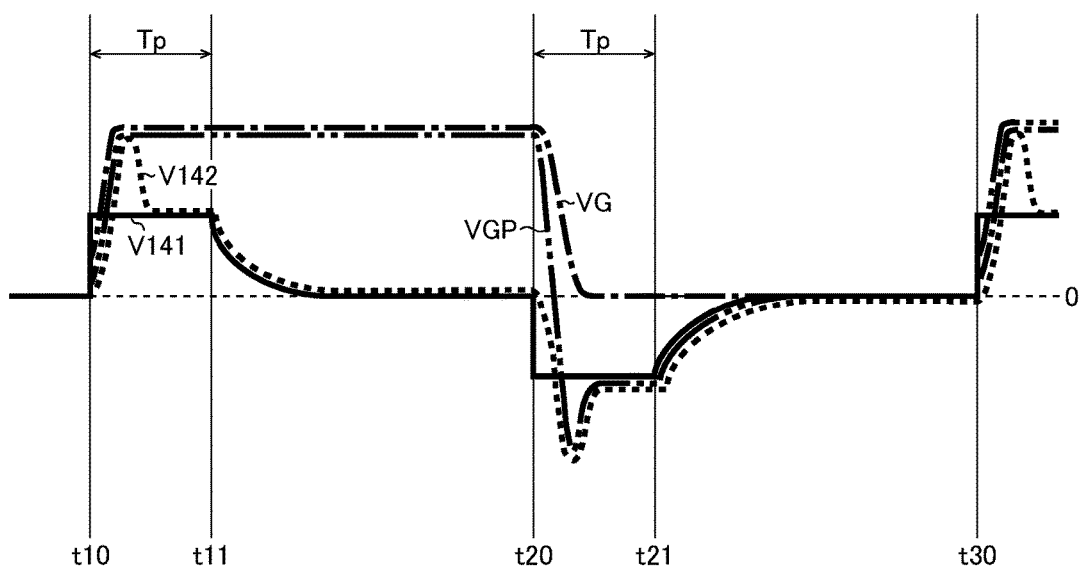
FIG. 26 is a waveform diagram illustrating voltage behavior of individual portions in the third example.

FIG. 26 is a waveform diagram indicating voltage behaviors of individual portions in the third example. In this diagram, a solid line indicates the control voltage V141, a broken line indicates the induced voltage V142, a dot-dashed line indicates the gate voltage VG, and a two-dot dashed line indicates a gate voltage VGP of the transistor P1. Note that, the control voltage V141 is a voltage having a reference point (0 V) at the second tap T32 of the primary winding 141. On the other hand, the induced voltage V142, the gate voltage VG, and the gate voltage VGP are voltages having a reference point (0 V) at the second tap T42 of the secondary winding 142. In addition, the time points t10 to t30 in this diagram correspond to time points t10 to t30 in FIGS. 22 and 23.

When the positive control voltage V141 (T31>T32) is applied to the primary winding 141 at the time point t10, the positive induced voltage V142 (T41>T42) is generated in the secondary winding 142 by the forward operation of the pulse transformer 140. Therefore, the diode D1 becomes forward biased. In addition, when the induced voltage V142 is positive, the gate of the transistor N1 has a lower potential than the source. Therefore, the transistor N1 remains to be off. However, when the induced voltage V142 is positive, the parasitic diode of the transistor N1 becomes forward biased, and then the gate voltage VGP increases following the induced voltage V142. Therefore, the transistor Pb is not turned on.

As a result, current flows in the path from the secondary winding 142 (the first tap T41) to the diode D1, to the parasitic capacitor Cgs, and to the secondary winding 142 (the second tap T42), and hence the parasitic capacitor Cgs is charged in the positive direction. This state corresponds to the state where the gate voltage VG is raised to the high level.

Note that, when the positive control voltage V141 is applied, a positive whisker-like surge is transiently generated in the induced voltage V142. Therefore the gate voltage VG and the gate voltage VGP are increased to be close to the positive peak value of the whisker-like surge along with the transition to the high level.

Along with the convergence of the transient response described above, the induced voltage V142 becomes lower than the gate voltage VG, and hence the diode D1 becomes reverse biased. In addition, as long as the induced voltage V142 is positive, the transistor N1 remains to be off. Further, the parasitic diode of the transistor N1 becomes reverse biased so that a discharge path of the gate voltage VGP is broken, and hence the transistor P1 remains to be off. Therefore, the charge and discharge path of the parasitic capacitor Cgs is broken. As a result, also after the induced voltage V142 is stabilized to a steady-state value, the gate voltage VG is maintained to be close to the positive peak value of the whisker-like surge.

After that, at the time point t11 when the pulse time Tp is elapsed from the time point t10, application of the positive control voltage V141 to the primary winding 141 is stopped, and hence the induced voltage V142 is not generated in the secondary winding 142. In this case, the diode D1 remains to be reverse biased, and both the transistors N1 and P1 remain to be off. Therefore, the charge and discharge path of the parasitic capacitor Cgs is maintained to be broken also after the time point t11. As a result, the gate voltage VG is maintained at the high level without changing also after the time point t11.

When the negative control voltage V141 (T31<T32) is applied to the primary winding 141 at the time point t20, the negative induced voltage V142 (T41<T42) is generated in the secondary winding 141 by the forward operation of the pulse transformer 140. In this case, the diode D1 is remained to be reverse biased. On the other hand, the transistor N1 is turned on at time point when the gate-source voltage becomes higher than the ON threshold voltage. Therefore, the gate voltage VGP becomes negative, and hence the transistor P1 is also turned on.

As a result, the parasitic capacitor Cgs is short-circuited at both ends via the transistor P1 and is discharged until the gate voltage VG becomes 0 V. This state corresponds to a state where the gate voltage VG is dropped to the low level.

Note that, when the negative control voltage V141 is applied, a negative whisker-like surge is transiently generated in the induced voltage V142. Therefore the gate voltage VGP of the transistor P1 is dropped to be close to the negative peak value of the whisker-like surge along with the transition to the low level. On the other hand, the gate voltage VG of the transistors 21 and 22 is dropped only to 0 V, as described above.

In this way, unlike the first example (FIG. 21) and the second example (FIG. 24) described above, the low level of the gate voltage VG does not become negative in the driving circuit 160 of this example. Therefore, it is also possible to drive the MOS switch having a limited dynamic range of the gate input, without an obstacle.

After that, at the time point t21 when the pulse time Tp is elapsed from the time point t20, application of the negative control voltage V141 to the primary winding 141 is stopped, and hence the induced voltage V142 is not generated in the secondary winding 142. In this case, the transistors N1 and P1 are turned off when the gate-source voltages thereof become lower than the ON threshold voltage. By the series of operation described above, after the time point t21, the gate voltage VGP of the transistor P1 becomes close to 0 V until the transistor N1 is turned off. On the other hand, the gate voltage VG of the transistors 21 and 22 is remained to be 0 V also after the time point t21.

Also after the time point t30, the positive on trigger pulse (time point t10 to time point t11) and the negative off trigger pulse (time point t20 to time point t21) are alternately generated as the control voltage V141, and hence the gate drive operation similar to the above description is repeated.

Note that this example may be implemented based on the first example (FIG. 21) described above.

Driving Circuit (Fourth Example)

Figure 27:
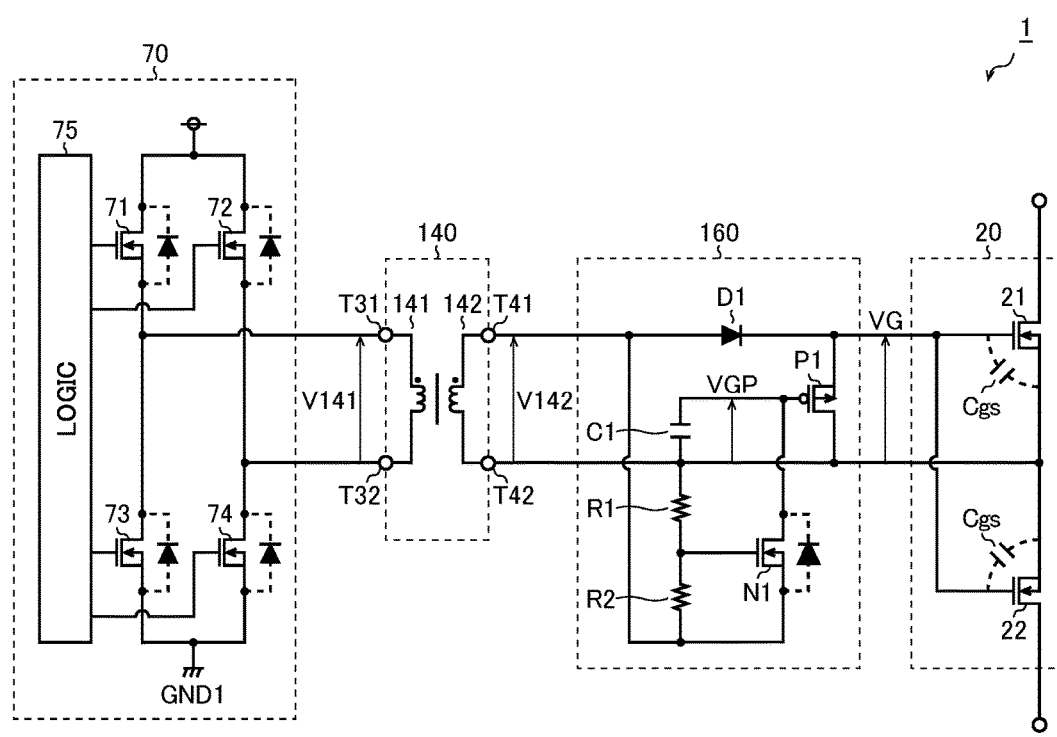
FIG. 27 is a circuit diagram illustrating a fourth example of the driving circuit.

FIG. 27 is a circuit diagram illustrating a fourth example of the driving circuit. The driving circuit 160 of this example is based on the third example (FIG. 25) described above and further includes a capacitor C1 connected between gate and source of the transistor P1. Thus, also after the transistor N1 is switched from ON to OFF, the gate of the transistor P1 does not become a floating state, and the gate voltage VGP of the transistor P1 is maintained to be negative until the capacitor C1 is completely discharged. As a result, the ON period of the transistor P1 can be extended so that remaining of the gate voltage VG can be prevented, and hence the transistors 21 and 22 can be securely turned off. Note that, it is sufficient that the capacitor C1 has a capacitance sufficiently smaller (approximately 1/10) than the parasitic capacitor Cgs of the transistors 21 and 22.

Driving Circuit (Fifth Example)

Figure 28:
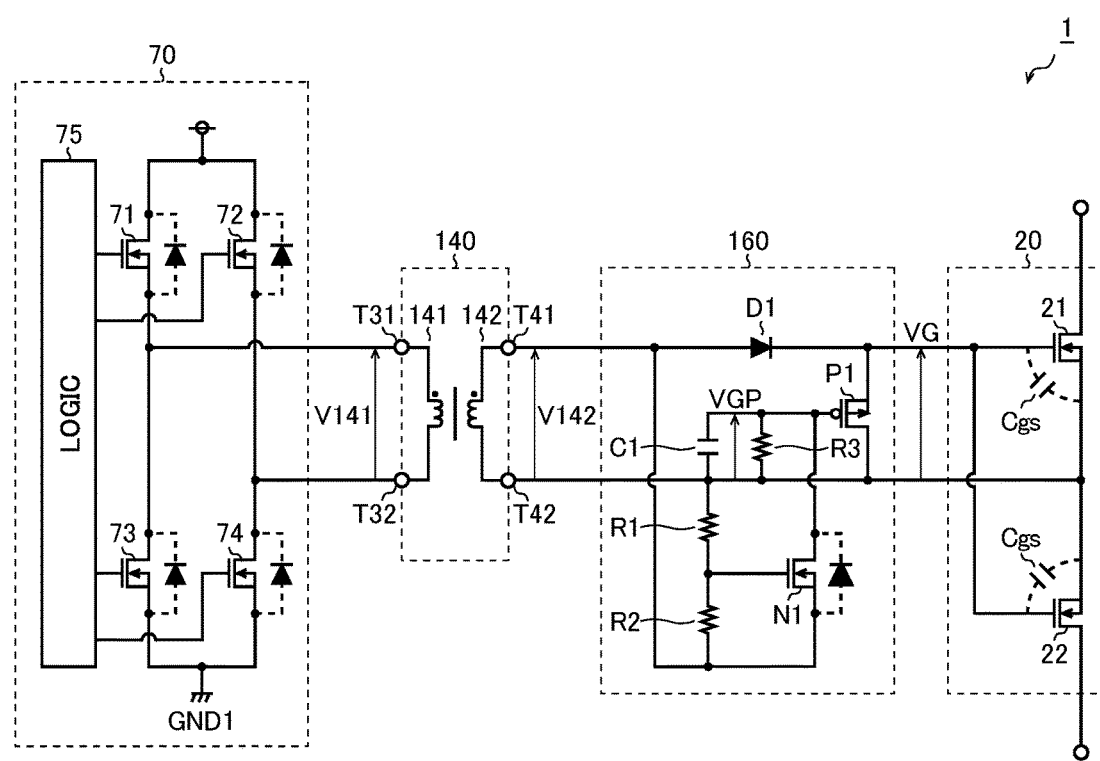
FIG. 28 is a circuit diagram illustrating a fifth example of the driving circuit.

FIG. 28 is a circuit diagram illustrating a fifth example of the driving circuit. The driving circuit 160 of this example is based on the fourth example (FIG. 27) described above and further includes a resistor R3 connected between gate and source of the transistor P1. Thus, even if noise is applied to the gate of the transistor P1, an unintentional variation of the gate voltage VGP can be suppressed so that erroneous operation of the transistor P1 can be prevented. Note that this example may be implemented based on the third example (FIG. 25) described above.

Driving Circuit (Sixth Example)

Figure 29:
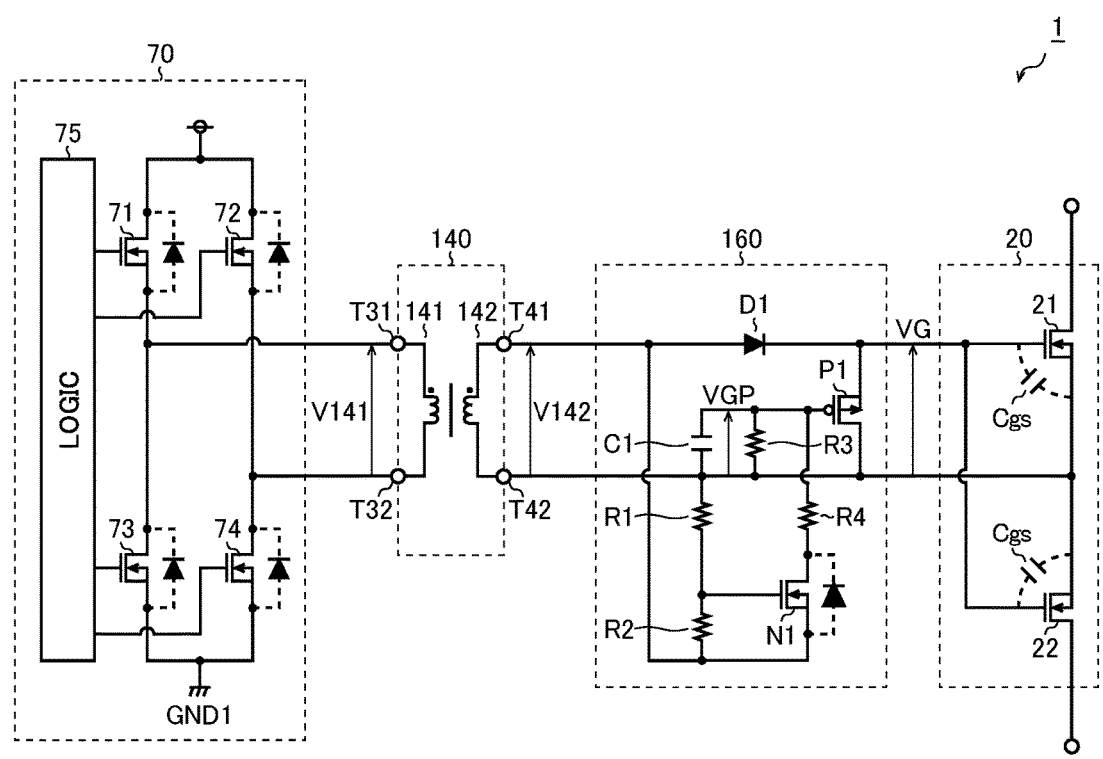
FIG. 29 is a circuit diagram illustrating a sixth example of the driving circuit.

FIG. 29 is a circuit diagram illustrating a sixth example of the driving circuit. The driving circuit 160 of this example is based on the fifth example (FIG. 28) described above and further includes a resistor R4 connected between the gate of the transistor P1 and the drain of the transistor N1. Thus, drain current of the transistor N1 can be adjusted to be an appropriate value. Note that this example may be implemented based on one of the first to fourth examples (FIGS. 21, 24, 25 and 27) described above.

Driving Circuit (Seventh Example)

Figure 30:
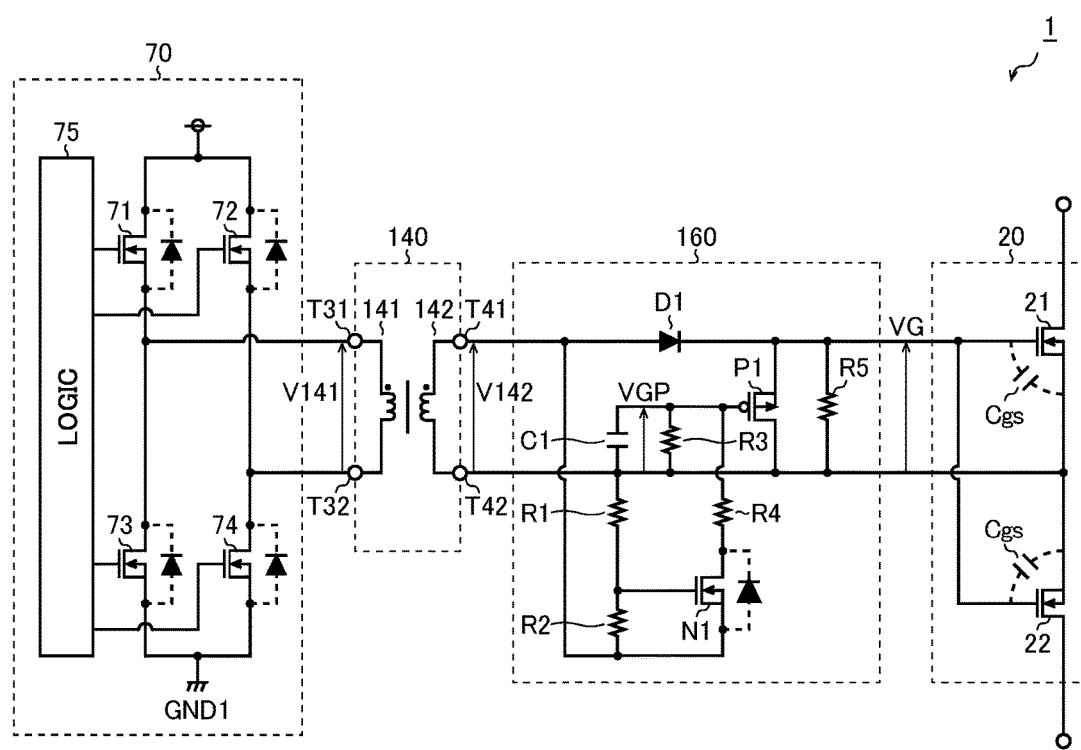
FIG. 30 is a circuit diagram illustrating a seventh example of the driving circuit.

FIG. 30 is a circuit diagram illustrating a seventh example of the driving circuit. The driving circuit 160 of this example is based on the sixth example (FIG. 29) described above and further includes a resistor R5 connected between gate and source of the transistors 21 and 22. Thus, even if noise is applied to the gates of the transistors 21 and 22, an unintentional variation of the gate voltage VG can be suppressed so that erroneous operation of the transistors 21 and 22 can be prevented. Note that this example may be implemented based on one of the first to fifth examples (FIGS. 21, 24, 25, 27 and 28) described above.

Driving Circuit (Eighth Example)

Figure 31:
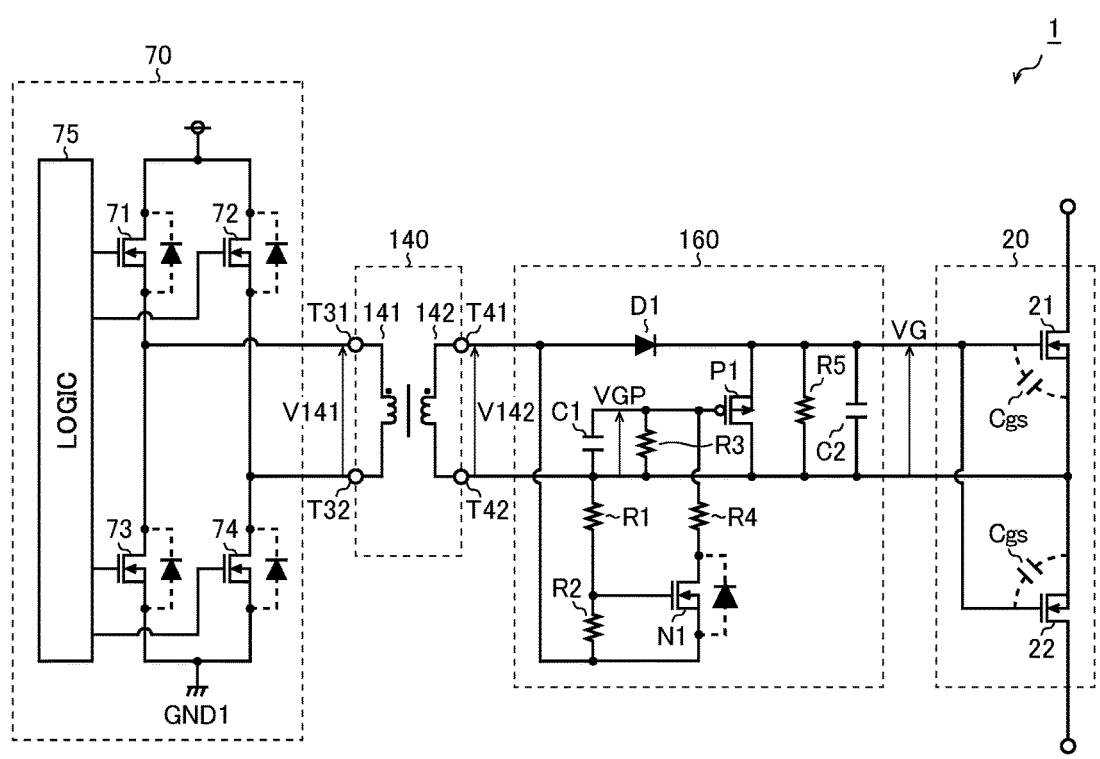
FIG. 31 is a circuit diagram illustrating an eighth example of the driving circuit.

FIG. 31 is a circuit diagram illustrating an eighth example of the driving circuit. The driving circuit 160 of this example is based on the seventh example (FIG. 30) described above and further includes a capacitor C2 connected between gate and source of the transistors 21 and 22. Thus, even if the parasitic capacitor Cgs has a small capacitance, a sustaining period of the gate voltage VG can be secured. Note that this example may be implemented based on one of the first to sixth examples (FIGS. 21, 24, 25, 27, 28 and 29) described above.

Note that application targets of the driving circuit 160 described above are not limited to the AC/DC converter 1, but the driving circuit 160 can be widely applied to general applications having a MOS switch (such as a motor driving device). In particular, the driving circuit 160 can be appropriately used as gate driving means of a large power MOS switch having a large gate capacitance or MOS switches connected in parallel.

<Other Variations>

Note that the various technical features disclosed in this specification can be variously modified without deviating from the spirit of the technical invention besides the embodiments described above. In other words, the embodiments described above are merely examples in every aspect and should not be interpreted as limitations. The technical scope of the present invention is defined not by the above description of the embodiments but by claims and should be interpreted to include all modifications within the meanings and ranges equivalent to the claims.

INDUSTRIAL APPLICABILITY

The AC/DC converter disclosed in this specification can be used as a power supply of general electric equipment and industrial equipment.

What is claimed is:

1. An AC/DC converter comprising:
   a transformer including a primary winding connected to an AC power source and a secondary winding electromagnetically coupled to the primary winding;
   a bidirectional switch connected in series to the primary winding;
   a resonant capacitor connected in parallel or series to the bidirectional switch;
   a capacitor voltage divider circuit arranged to divide a voltage across both ends of the bidirectional switch so as to generate a divided voltage; and
   a control circuit arranged to turn on the bidirectional switch at a timing when the divided voltage becomes zero.

2. The AC/DC converter according to claim 1, wherein the capacitor voltage divider circuit includes a first capacitor connected in series to the resonant capacitor, so that the divided voltage is output from a connection node between the resonant capacitor and the first capacitor.

3. The AC/DC converter according to claim 1, wherein the capacitor voltage divider circuit a first capacitor and a second capacitor connected in series to each other between both ends of the bidirectional switch, so that the divided voltage is output from a connection node between the first capacitor and the second capacitor.

4. The AC/DC converter according to claim 2, wherein the first capacitor has an end connected to a reference potential terminal of the control circuit.

5. The AC/DC converter according to claim 4, wherein the capacitor voltage divider circuit further includes a discharge switch connected in parallel to the first capacitor.

6. The AC/DC converter according to claim 5, wherein the control circuit turns on and off the discharge switch in synchronization with the bidirectional switch.

7. The AC/DC converter according to claim 1, wherein the transformer is a leakage transformer or a resonant transformer having leakage inductance, and the AC/DC converter takes out both forward voltage and flyback voltage from the secondary winding, so as to directly convert an AC input voltage supplied from the AC power source into a DC output voltage.

8. The AC/DC converter according to claim 1, further comprising a coil connected to at least one of the primary winding and the secondary winding, wherein the AC/DC converter takes out both forward voltage and flyback voltage from the secondary winding, so as to directly convert an AC input voltage supplied from the AC power source into a DC output voltage.

9. The AC/DC converter according to claim 1, wherein the control circuit drives the bidirectional switch so that power factor becomes close to one.

10. The AC/DC converter according to claim 1, wherein the control circuit drives the bidirectional switch via a pulse transformer.

* * * * *